United States Patent [19]
Minakawa et al.

[11] Patent Number: 5,347,108
[45] Date of Patent: Sep. 13, 1994

[54] MICROWAVE OVEN HAVING A FUNCTION FOR MATCHING IMPEDANCE

[75] Inventors: Hiroshi Minakawa, Higashiosaka; Masatugu Fukui, Osaka; Masayuki Uno, Yamatotakada; Hiroshi Kinoshita, Nishinomiya, all of Japan

[73] Assignee: Sharp Kabushiki Kaisha, Osaka, Japan

[21] Appl. No.: 6,959

[22] Filed: Jan. 21, 1993

[30] Foreign Application Priority Data

| | | | |
|---|---|---|---|
| Jan. 23, 1992 | [JP] | Japan | 4-010067 |
| Mar. 24, 1992 | [JP] | Japan | 4-065829 |
| Sep. 24, 1992 | [JP] | Japan | 4-253321 |
| Sep. 25, 1992 | [JP] | Japan | 4-256291 |

[51] Int. Cl.$^5$ .............................. H05B 6/74
[52] U.S. Cl. ............................ 219/696; 219/750; 219/708
[58] Field of Search .............. 219/10.55 F, 10.55 A, 219/10.55 B, 10.55 R, 695, 696, 747, 750, 745, 708; 333/32, 253, 231, 232, 233

[56] References Cited

U.S. PATENT DOCUMENTS

| | | | |
|---|---|---|---|
| 2,909,635 | 10/1959 | Haagensen | 219/10.55 F |
| 4,179,595 | 12/1979 | Chiron | 219/10.55 F |
| 4,324,965 | 4/1982 | Naumann et al. | 219/10.55 F |
| 4,520,250 | 5/1985 | Ishihara et al. | 219/10.55 B |
| 4,689,459 | 8/1987 | Gerling | 219/10.55 A |
| 4,714,812 | 12/1987 | Haagensen et al. | 219/10.55 A |
| 4,883,570 | 11/1989 | Ethimion et al. | 219/10.55 A |
| 5,171,947 | 12/1992 | Kusunoki et al. | 219/10.55 B |

FOREIGN PATENT DOCUMENTS

| | | |
|---|---|---|
| 55-88289 | 7/1980 | Japan . |
| 56-64575 | 12/1981 | Japan . |
| 56-160792 | 12/1981 | Japan . |
| 61-100897 | 6/1986 | Japan . |
| 1-25513 | 7/1989 | Japan . |
| 3-17148 | 4/1991 | Japan . |
| 3-20648 | 3/1991 | Japan . |

*Primary Examiner*—Philip H. Leung

[57] ABSTRACT

A microwave oven includes a heating chamber, a turntable provided in the oven, a magnetron, a waveguide for guiding the microwave generated by the magnetron into the heating chamber, an electric field sensor provided at the inner wall face of the waveguide or the heating chamber, a metal reflector provided rotatably inside the waveguide for adjusting the impedance of a load at the heating chamber side by its rotation angle, and a circuit responsive to an output of the electric field sensor for controlling the rotation angle of the metal reflector. The control circuit includes a first program for controlling the rotation angle of the metal reflector according to a first method within a predetermined time period from the start of operation of the microwave oven, and a second program for controlling the rotation angle of the metal reflector according to a second method different from the first method after elapse of the predetermined time period. For example, in the first method, the rotation angle of the metal reflector is sequentially controlled so that the output of the electric field sensor is minimum, and in the second method, the rotation angle of the metal reflector is fixed to an average value of the rotation angle of the metal reflector of the first method. The initial rotation angle of the metal reflector is determined so that impedance matching can be obtained when load of approximately 300–500 cc calculated in water load is placed at the center of the heating chamber.

68 Claims, 30 Drawing Sheets

TOWARDS POWER SOURCE SIDE ← | → TOWARDS LOAD SIDE

▨ : REGION WHERE MAXIMUM OUTPUT IS OBTAINED

◉ : CONTOURED OUTPUT CURVE LINE GROUP

⌇ : IMPEDANCE CHANGE IN OVEN IN ACCORDANCE WITH ROTATION OF REFLECTOR

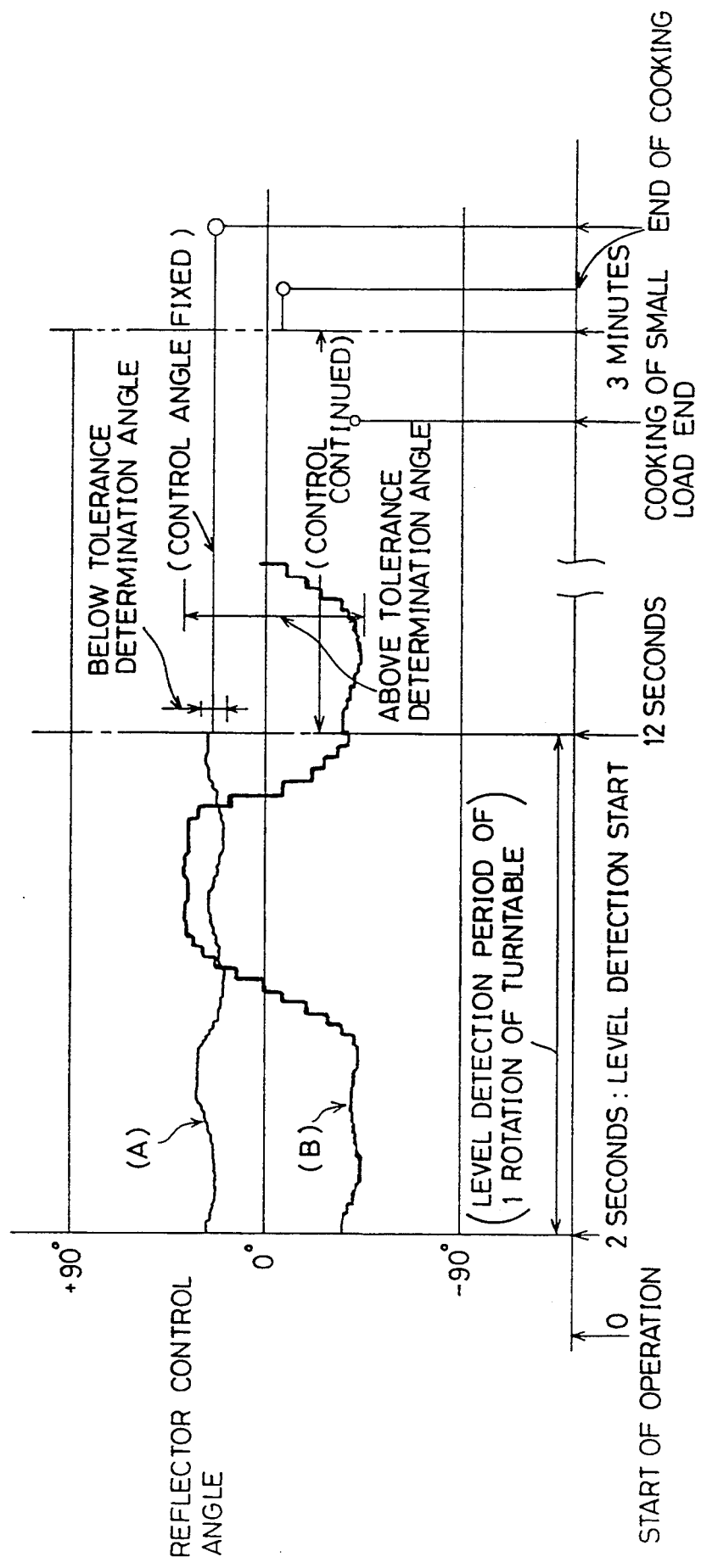

(a)  (b)

(c)

(a)  (b)

(c)

(a): NOT CONTROLLED AT REFLECTOR INITIAL POSITION (b): ANGLE CONTROL OF REFLECTOR (c): REFLECTOR ANGLE FIXED TO AVERAGE VALUE AFTER ELAPSE OF PREDETERMINED TIME

TO LOAD SIDE ← → TO MAGNETRON SIDE

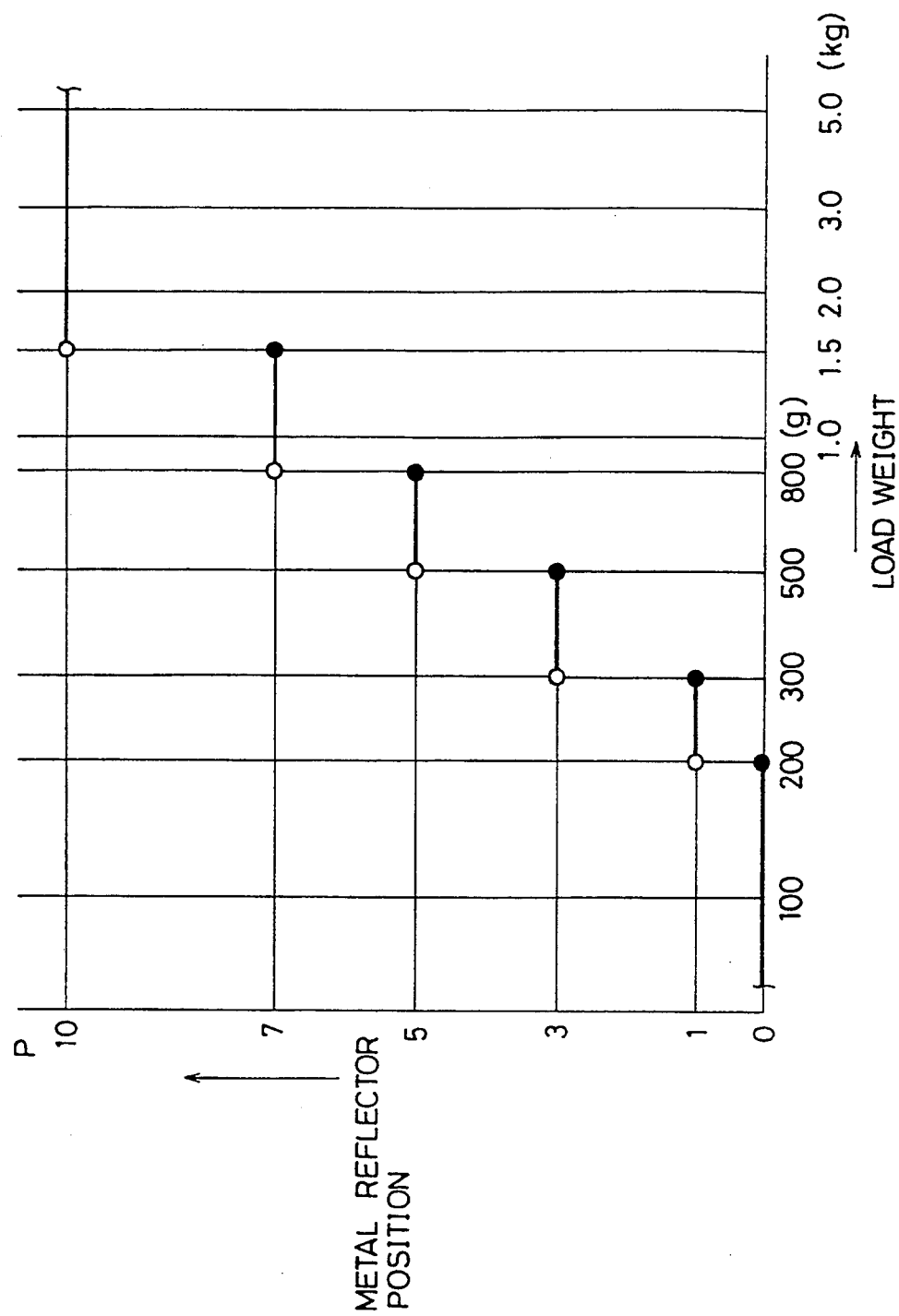

MICROWAVE OVEN HAVING A FUNCTION FOR MATCHING IMPEDANCE

BACKGROUND OF THE INVENTION

1. Field of the Invention

The present invention relates to a microwave oven, and more particularly to the control of matching impedance of a microwave generating device and a load in a microwave oven.

2. Description of the Background Art

It is known that the impedance in a heating chamber varies depending upon the magnitude of load and position of the food item in a microwave oven. Because of this variance in impedance, the impedance between the magnetron and the heating chamber cannot be matched. As a result, the electric field by the microwave reflected from the heating chamber therein increases. In such a case, the power of the microwave cannot be effectively used. A microwave oven is disclosed that can adjust the position of a metal reflector for matching impedance in order to reduce the reflected electric field of the microwave (refer to Japanese Utility Model Laying-Open No. 61-100897, Japanese Patent Laying-Open No. 56-160792).

Another microwave oven is disclosed that can control impedance by moving a stub and/or a metal reflector depending upon the weight of food or the specified heating time according to a cooking program (refer to Japanese Utility Model Publication No. 1-25513, Japanese Patent Laying-Open No. 55-88289).

These conventional microwave ovens are directed to carry out effective operation of microwave power by closely controlling and adjusting the position of the device for matching impedance such as a metal reflector.

In order to effectively carry out impedance matching by rotating a metal reflector within a waveguide, it is necessary to move the position of a metal stub provided in a rotation plate (disk) of the metal reflector in the degree of $\lambda g/4$ ($\lambda g$: wavelength within waveguide of microwave) where the maximum and minimum value of the voltage of the standing wave of the microwave for the microwave oven (2450 MHz) appears.

Therefore, the rotation plate of the metal reflector must have a diameter of approximately 40 mm corresponding to $\lambda g/4$. The device for matching impedance is provided in the waveguide having a high microwave electric field. In order to avoid arcing due to voltage induced by the microwave from the device for matching impedance of a metal reflector and the like, the device for matching impedance must be remote from the wall face of the waveguide by a sufficient spatial distance. Taking also into account the electric field concentration towards the end portion of the device for matching impedance, and change in the reflected wave depending upon the condition of load (light load) in the oven, the device for matching impedance should be as small as possible in order to avoid atmospheric discharge within the waveguide.

Effective usage of microwave power can be expected by controlling and adjusting the position of the impedance-matching reflector for reducing the reflected power from the oven including the substance to be heated. A possible method is to continuously control and drive the impedance-matching device by a motor or the like in cooking the substance-to-be-heated. However, because the load position is always changing in a microwave oven employing a turntable mechanism, the load is great in the driving mechanism for continuous follow. In view of the specified life time of a microwave oven, there is problem in the cost and reliability of the impedance-matching device.

In view of the foregoing, the usage of an impedance-matching device in a microwave oven manufactured in mass production has the following problems.

In the manufacturing stage, the structure of the impedance-matching device and the structure of members thereof must be made to be applicable for mass production while optimizing the adjustable region of impedance and carrying out measures with respect to arcing within the waveguide.

Although information of the food load in the oven is not obtained right after the initiation of a cooking operation, it is desirable to determine the operation mode of the impedance-matching device at the start of the operation to obtain a preferable result.

Although the heated time of cooking is normally short in cooking light food the time for detecting information to determine the heating mode in operation of the food in the oven by an electric field sensor or a weight sensor takes several seconds to ten several seconds which is a relatively long time. Because the heating mode at the start of operation greatly affects the heating efficiency of food of light load, the load must be determined taking into consideration the magnitude thereof.

A change in impedance is expected due to difference in temperature before and after cooking the food item, or due to change in weight caused by vaporization of the food. It is therefore necessary to sense and correct it appropriately.

The impedance-matching device employed in an economic type microwave oven for domestic use must have low component cost.

SUMMARY OF THE INVENTION

In view of the foregoing, an object of the present invention is to provide a microwave oven having an impedance-matching system of high reliability that can allow effective usage of the microwave.

Another object of the present invention is to provide a microwave oven having a small impedance-matching system of high reliability allowing effective usage of the microwave.

A further object of the present invention is to provide a microwave oven of a small impedance-matching system of high reliability allowing effective usage of the microwave without the possibility of arcing in a waveguide.

Still another object of the present invention is to provide a microwave oven suitable for mass production having a small impedance-matching system of high reliability allowing effective usage of the microwave without the possibility of arcing in a waveguide.

A still further object of the present invention is to provide a microwave oven suitable for mass production having a small impedance-matching system of high reliability allowing effective usage of the microwave and without arcing in a waveguide, and that can carry out an appropriate heating operation according to the weight of the food item.

Yet a further object of the present invention is to provide a microwave oven suitable for mass production having a small impedance-matching system of high reliability allowing effective usage of the microwave without the possibility of arcing within a waveguide, and that can carry out appropriate heating operation according to the weight or cooking time of food.

Yet another object of the present invention is to provide a microwave oven suitable for mass production having an economic and small impedance-matching system of high reliability allowing effective usage of the microwave without the possibility of arcing in a waveguide, and that can carry out appropriate heating operation according to the weight or cooking time of food.

A microwave oven according to the present invention includes a heating chamber having an opening through which a microwave is introduced therein, a turntable provided in the heating chamber for supporting a substance to be heated, a device for generating a microwave, a waveguide for guiding a microwave into the heating chamber via the opening, an electric field sensor provided in the inner wall face of the waveguide or the heating chamber, a metal reflector provided rotatably about a predetermined shaft in the proximity of the opening within the waveguide for adjusting the impedance of the load at the heating chamber side by a rotation angle thereof, and a device responsive to an output of the electric field sensor for controlling the rotation angle of the metal reflector. The control device includes a first program for controlling the rotation angle of the metal reflector according to a first method during a predetermined time after initiation of the operation of the microwave oven, and a second program for controlling the rotation angle of the metal reflector according to a second method differing from the first method after elapse of the predetermined time after initiation of the operation of the microwave oven.

For example, the rotation angle of the metal reflector is sequentially controlled so that the output of the electric field sensor is minimized in the first method, and the rotation angle of the metal reflector is fixed to an average value of the rotation angle of the metal reflector during the first method in the second method. The initial value of the rotation angle of the metal reflector in the first method is determined such that impedance matches when load of a predetermined magnitude, for example, load of approximately 300–500 cc calculated in water load is placed in the center of the heating chamber.

The control device controls the rotation angle of the reflector following change in impedance of load of the substance to be heated during a predetermined time at the early stage of the microwave oven operation, whereby the total time for reflector control out of the total operation period of the microwave oven is limited. The reliability of the control device is improved, and the usage efficiency of power of the microwave can be improved. At the time of light load, the heating efficiency can be improved by setting the position of the reflector at an optimum impedance position at the early stage of operation and then moving it to a predetermined position.

According to another aspect of the present invention, a microwave oven includes a heating chamber to which microwave is introduced therein, a device for generating a microwave, and a waveguide for directing the microwave into the heating chamber. The waveguide has a concave portion in which a first opening is formed that communicates with outside of the waveguide at a predetermined position in the internal face. The microwave oven further includes an electric field sensor provided within the waveguide, a shaft formed of a dielectric having its tip inserted retractably through the first opening into the waveguide, a stub formed of a nonmagnetic metal attached to the end of the shaft in the waveguide and formed of a size such that a portion thereof is retractable with a predetermined margin within the concave portion, and a circuit responsive to an output of the electric field sensor for controlling the length of a portion of the stub inserted into the waveguide to match the impedance of the microwave generating device and the load in the heating chamber.

Because a concave portion is provided in the waveguide at the position which is in the closest proximity to the stub, arcing is prevented by reducing the electric field of this portion.

By providing the opening for inserting the assembly of a stub and a shaft into a predetermined position in the waveguide at the wall face of the waveguide opposing the opening, the attachment of the assembly to the waveguide can be facilitated.

According to a further aspect of the present invention, a microwave oven includes a heating chamber having an opening through which a microwave is introduced, a turntable provided in the heating chamber for supporting a substance to be heated, a device for generating a microwave, a waveguide for guiding the microwave in a predetermined traveling direction to direct the same into the heating chamber through the opening, an electric field sensor provided in the inner wall face of the waveguide or the heating chamber, a device provided rotatably about a predetermined shaft in the proximity of the opening in the waveguide for adjusting impedance of the load at the heating chamber side by a rotation angle thereof, and a device responsive to an output of the electric field sensor for controlling the rotation angle of the impedance-adjusting device. The device for adjusting the impedance includes a rotation shaft provided in the waveguide to cross the direction of travel of the microwave by a predetermined angle, a rotation plate having a metal face attached to the rotation shaft, and a metal stub formed projecting from the metal face at the peripheral portion of the rotation plate at a predetermined angle with respect to the metal face.

The above-described control device may include a memory for prestoring a table of target rotation angles of the impedance-adjusting device, a weight sensor for detecting the weight of the substance to be heated that is conveyed into the heating chamber, and a circuit for controlling the rotation angle of the impedance-adjusting device by table lookup of the target rotation angle with the detected weight as an argument.

The rotation plate may be provided with its rotation axis substantially perpendicular to the direction of travel of the microwave, or at an angle greater than 0° and less than 90°. In the case of the latter, the angle of the metal stub with respect to the metal face of the rotation plate may be selected to be equal to that of the rotation axis of the rotation plate to the direction of travel of the microwave.

The metal stub has a longitudinal component perpendicular to the wall face of the waveguide. The metal face rotates according to the rotation of the dielectric rotation shaft by the control means to move by a component of the direction of travel of the diameter of the metal face. Thus, the capacitance component and the induction component of the impedance can be adjusted to match the impedance.

The adjustment of the induction component and the capacitance component of impedance will be described in detail. It is assumed that the metal face is parallel to the direction of travel. Because there is almost no change in the distance between the wall face of the waveguide and the metal face depending on the rotation angle about the shaft of the metal face, there is also no change in the capacitance component. However, the position of the metal stub provided at the peripheral portion of the metal face changes greatly. The microwave electric field within the waveguide is high at the middle and low at the circumference in the cross section (E plane) of the waveguide. In the vertical cross section (H plane) of the waveguide, reflected wave exists with respect to the traveling wave. Therefore, there is a high and low electric field at an interval of half ($\lambda g/2$) of the wavelength ($\lambda g$) in the waveguide by the microwave frequency. By the rotation of a metal face of a disk of $\lambda g/4$ in diameter, for example, the metal stub moves along the circumference of the metal face, and passes the minimum point of the microwave electric field from the maximum point thereof. The control variation range of the induction component to be adjusted can be set by appropriately specifying the height of the metal stub.

In accordance with the amount of load of the food be heated, the position of the metal reflector can be controlled referring to the conditions stored in the memory. Then, in response to the intensity of the electric field of the microwave, the position of the metal reflector can be controlled to approximate the optimum control target value. Thus, an optimum matching impedance can be maintained in accordance with the state of the food load to improve the heating efficiency during cooking operation.

The foregoing and other objects, features, aspects and advantages of the pro, sent invention will become more apparent from the following detailed description of the present invention when taken in conjunction with the accompanying drawings.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention.

FIG. 7 is a graph showing the relationship between the control angle of a reflector and time.

FIG. 20 shows the schematic relationship between the weight of a food item and the rotation angle of a metal reflector.

FIGS. 23A and 23B are graphs of the output value of an electric field sensor during one rotation of the turntable over time, wherein FIG. 23A shows the case where the output value approximates an optimum control target value, and FIG. 23B shows the case where the maximum and minimum values of the output value exceed the tolerance range.

DESCRIPTION OF THE PREFERRED EMBODIMENTS

First Embodiment

Figure 1:
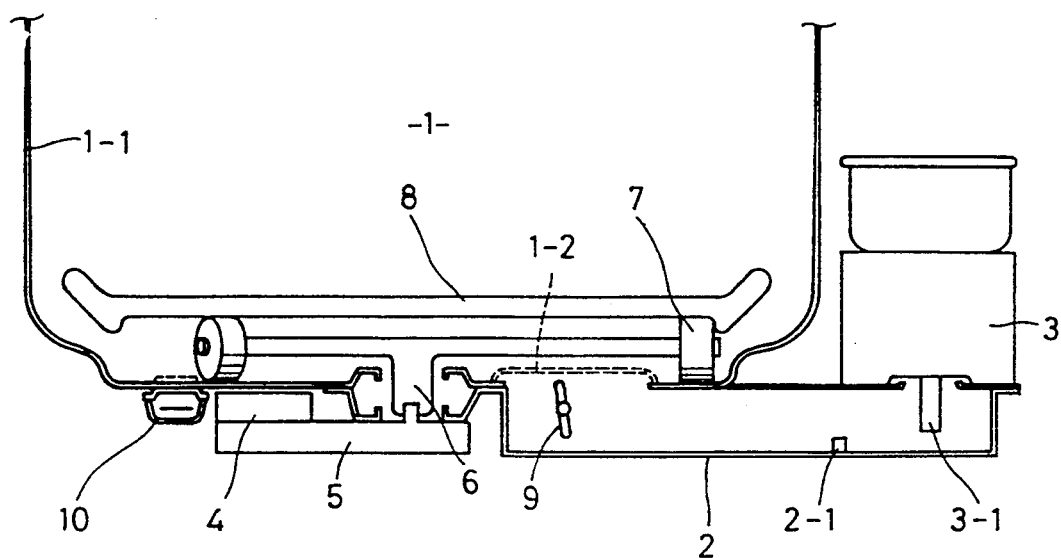
FIG. 1 is a sectional view of the main part of an embodiment of the present invention.

FIG. 1 is a sectional view of the main part of an embodiment of the present invention.

Referring to FIG. 1, an opening of a waveguide 2 is formed at a portion of a wall face 1—1 of a microwave oven 1. An antenna 3-1 of a magnetron 3 is provided at the other end of waveguide 2. A rotatable reflector 9 for matching impedance is provided at the opening side of waveguide 2. The opening is covered by an opening cover 1-2. A turntable 8 supported by a support roller 7 is provided at the bottom of heating chamber 1. Turntable 8 is rotated by a driving device formed of a turntable motor 4, a gear box 5, a drive shaft 6 and the like.

An electric sensor 10 is provided at an appropriate portion of heating chamber wall face 1—1. Electric field sensor 10 may be provided at the wall face of waveguide 2 that is continuous to heating chamber wall face 1—1. Electric field sensor 10 may be provided at a position that can easily receive influence of the electric field of the reflected wave obtained by an experiment. An element combining a chip type diode, resistor and condenser, for example, can be used as the electric sensor.

Figure 2:
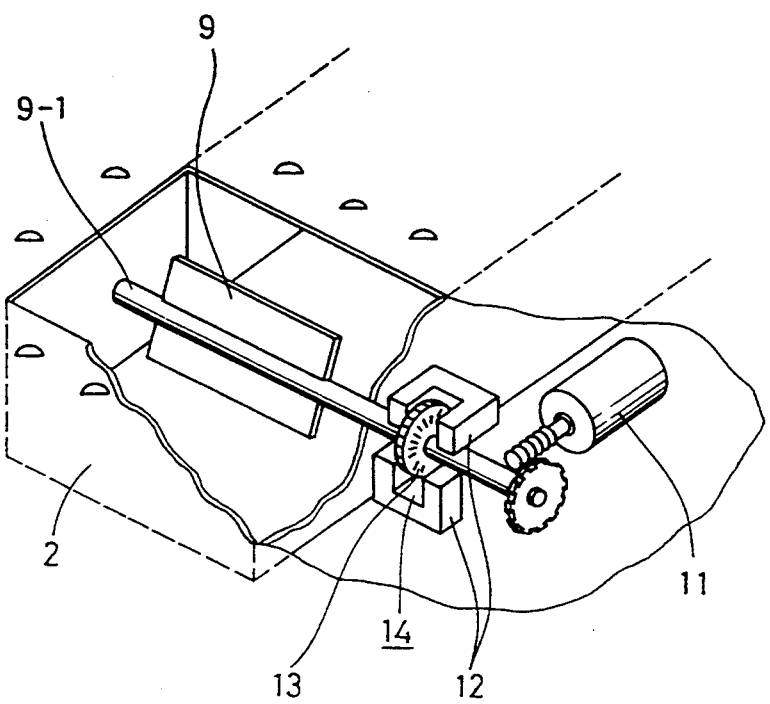
FIG. 2 is a perspective view of the main part of an impedance-matching device.

Referring to FIG. 2, reflector 9 for impedance matching is provided with a distance of at least 7 mm from the wall face of waveguide 2 in order to prevent arcing with waveguide 2 formed of a non-magnetic metal plate. Shaft 9-1 which is the rotation shaft thereof includes plastic of low dielectric constant and high heat resistance. Reflector motor 11 for rotating reflector 9 is connected to shaft 9-1 via a reduction gear with a photoencoder 14 such as a rotary encoder for detecting the rotation angle of reflector 9. Photoencoder 14 includes a photo interrupter 12 for identifying a rotation angle and a rotation plate 13. The photoencoder is not necessary when a stepping motor is used as the reflector motor.

Figure 3:
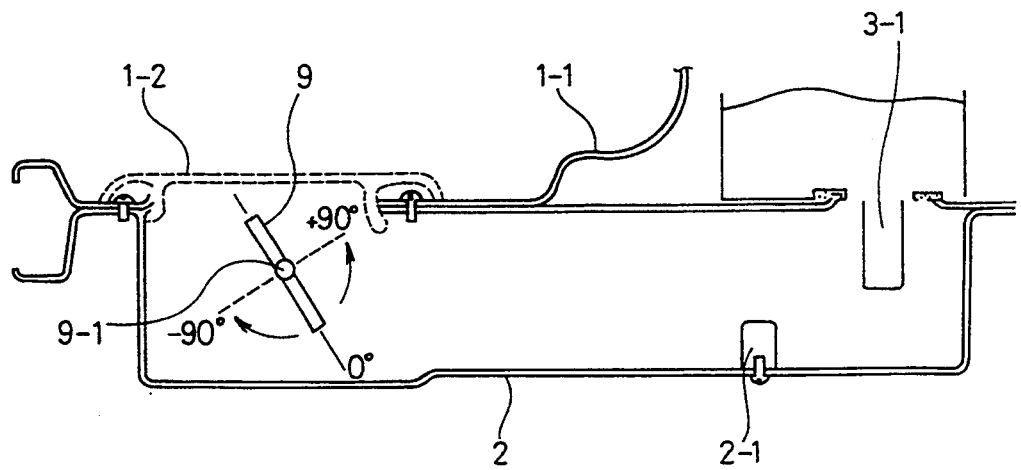
FIG. 3 is a sectional view for describing the rotation angle of a reflector.

FIG. 3 is a sectional view for describing the rotation angle of reflector 9. The initial position of angle 0 at the start of operation is based on a state where the reflector angle is adjusted so that impedance within the heating chamber results in a maximum output region in the Smith chart of FIG. 4, when the load in the heating chamber at the time of operating the microwave oven is light (corresponding to water load of approximately 500 cc or 300 cc), and placed on the center of turntable 8. The reflector can be rotated ±90° on the basis of the angle 0°. The angle of reflector 9 is changed depending on data obtained by the electric sensor and data such as weight and material obtained from the controller.

Figure 4:
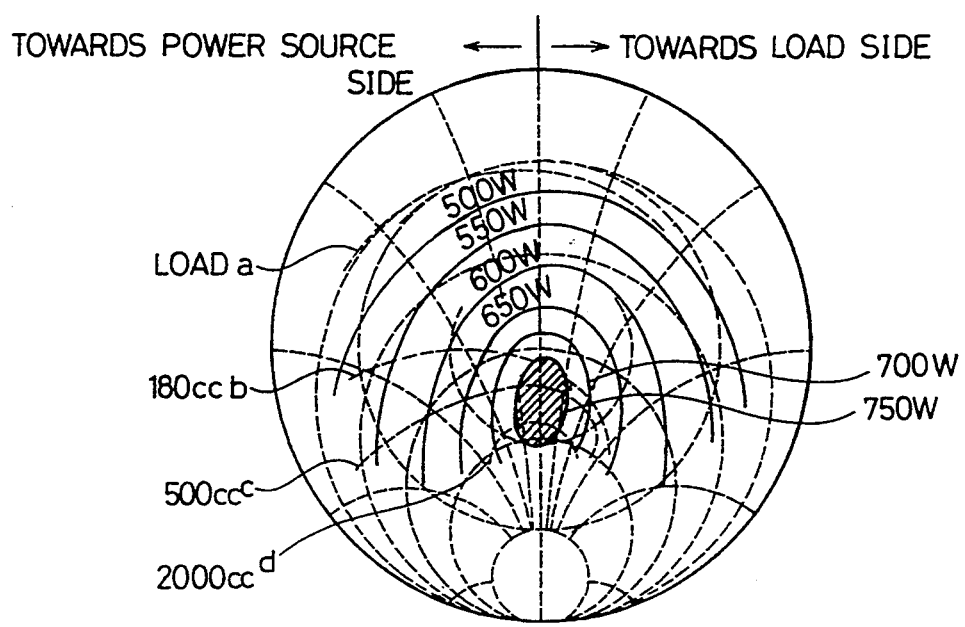
FIG. 4 is a Smith chart of a general heating chamber impedance of a microwave oven.

FIG. 4 is a Smith chart showing a general heating chamber impedance of a microwave oven. As an operation mode of a magnetron, an impedance chart and a contoured line output of a microwave radiated from the magnetron are indicated in solid lines, and the state of change in impedance when the reflector of FIG. 3 is rotated ±90° with respect to the initial position in the cases of no load, water load of 180 cc, 500 cc and 2000 cc are shown in broken lines a–d, respectively. Although there is a limit in the range that the reflector can control depending upon the water load in the heating chamber, the size of the reflector and the stub in the proximity of the antenna of the magnetron are set so that the control range by the reflector crosses the hatched region where the maximum output of the magnetron can be obtained regardless of the load.

Figure 5:
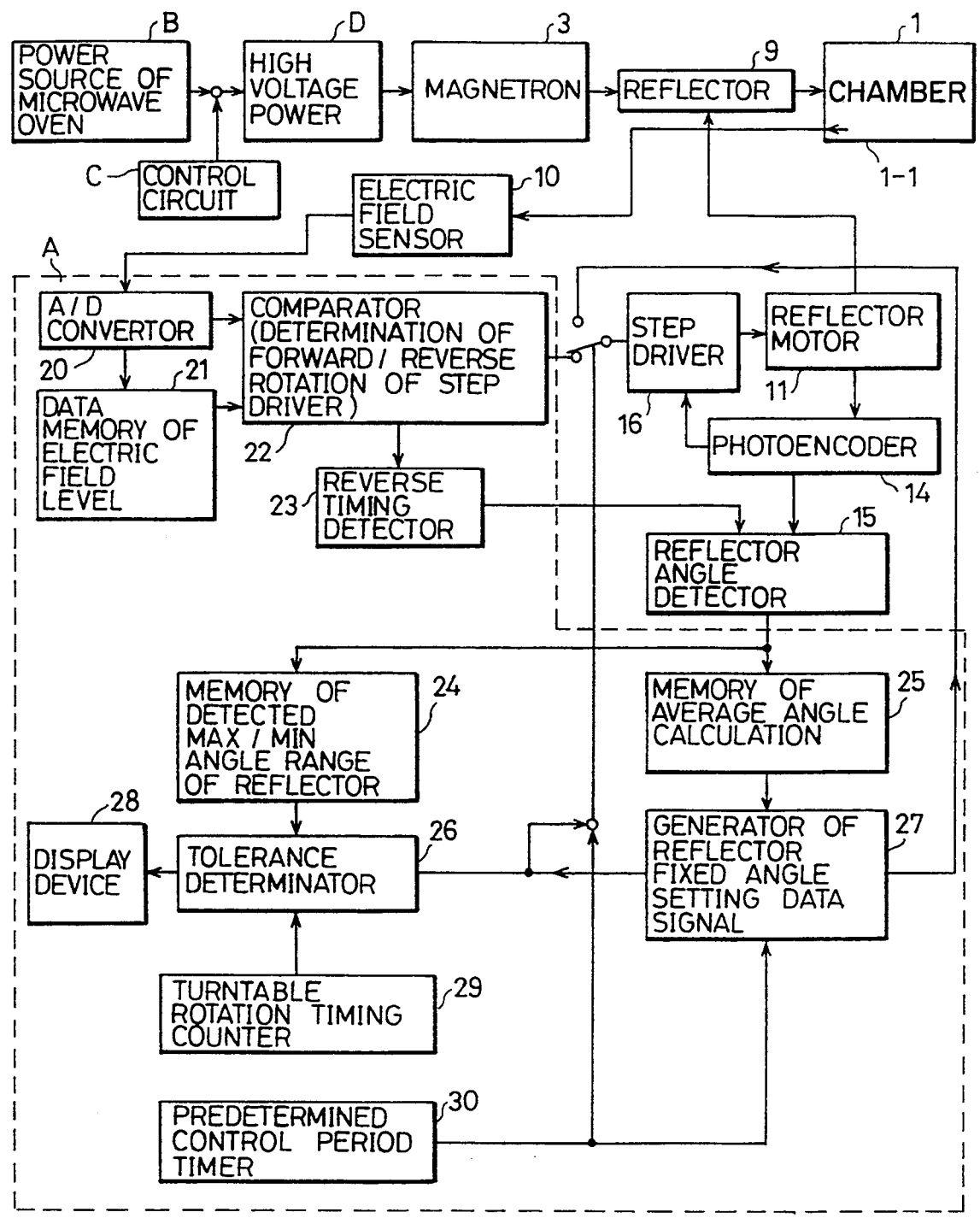
FIG. 5 is a block diagram of an embodiment of the present invention.

FIG. 5 is a block diagram regarding the reflector control by the electric field sensor of the active impedance matching system according to the present invention. Magnetron 3 is driven by a high voltage power source D controlling a control circuit C by a microwave oven power source B. Control means A of the rotation angle of reflector 9 is formed by devices 20-30 enclosed by a dotted line.

When the cooking operation of the microwave oven is initiated, the electric field state of heating chamber wall face 1—1 is detected by electric field sensor 10. The detected value is digitalized by an A/D converter 20 to allow logic operation. According to a predetermined angle of rotation, (for example about 2°) of reflector 9 as 1 step, reflector motor 11 is rotated by a step driver 16. The level of electric field sensor 10 is read out for each step to store the same in an electric field level data memory 21. This level is compared with a prior detected level in comparator 22. If the detected level of electric field sensor 10 is lower than the detected level of a prior rotation with the direction of the first rotation of reflector 9 in the forward direction, reflector motor 11 is driven such that reflector 9 rotates in the forward direction by a predetermined angle of 2°. The level thereof is compared with the preceding detected level, and rotation in the forward direction is repeated.

The time when the detected level of electric field sensor 10 becomes greater than the preceding detected level at a certain rotation step of reflector 9 is when the target value of the rotation angle has just been passed. This control angle of reflector 9 is identified by photoencoder 14. Because the load in the heating chamber continues its rotation by the turntable, step driver 16 is operated to drive reflector motor 11 to reverse the direction of the next rotation of reflector 9 from the prior forward direction as an output of comparator 22.

Reflector motor 11 will repeat direct rotation in the forward direction and in an opposite direction for each step to achieve a minimum level of detection of the electric field sensor. This is continued for a time period (approximately ten seconds) corresponding to one rotation of turntable 8. When approximately 40 msec is required to read out an electric field sensor level by A/D converter 20 for operation control in accordance with a rotation of 2° for 1 step of reflector 9, approximately 1.8 seconds is required for reflector 9 to rotate 90°. This is sufficient to follow the change in load impedance according to rotation of turntable 8 because reflector 9 repeats rotation in the forward direction and in an opposite direction in the order of 120-200 msec when a minimum value of a detected level is obtained.

The reverse timing of the rotation angle of reflector 9 by a reverse timing detector 23, and the angle of reflector 9 at that time is read out by photoencoder 14 to detect the angle by a reflector angle detector 15. The control maximum angle, minimum angle, and an average angle obtained from the integrated values thereof for one rotation of turntable 8 are obtained which are respectively registered into a memory 24 for storing data to detect a range of a maximum and minimum angle of reflector 9 and a memory 25 for storing data to calculate an average angle. Determination is made whether the range of the maximum angle and the minimum angle is within the tolerable range of impedance measured data of the microwave oven by a tolerance determination device 26. If within the tolerable range, a signal from a generator 27 of data setting a fixed angle of reflector 9 according to average angle data is provided to step driver 16 to drive reflector 9. If not in the tolerable range, the user of the microwave oven is notified that the food is not placed at an optimum position by displaying a message such as "food not in place" on a display 28 provided at an appropriate position in the controller of the microwave oven. A counter 29 of turntable 8 supplies the rotation timing of turntable 8 to tolerance determination device 26.

During a control continuation time (for example three minutes) set by a timer S0 for a predetermined control time, the angle of reflector 9 is controlled in optimum following the rotation of turntable 8. For an operation exceeding the predetermined control continuation time of three minutes, reflector motor 11 is driven so that reflector 9 is fixed at an average control angle of a certain period of rotation of turntable 8, whereby reflector 9 is stopped at the predetermined position.

Figure 6:
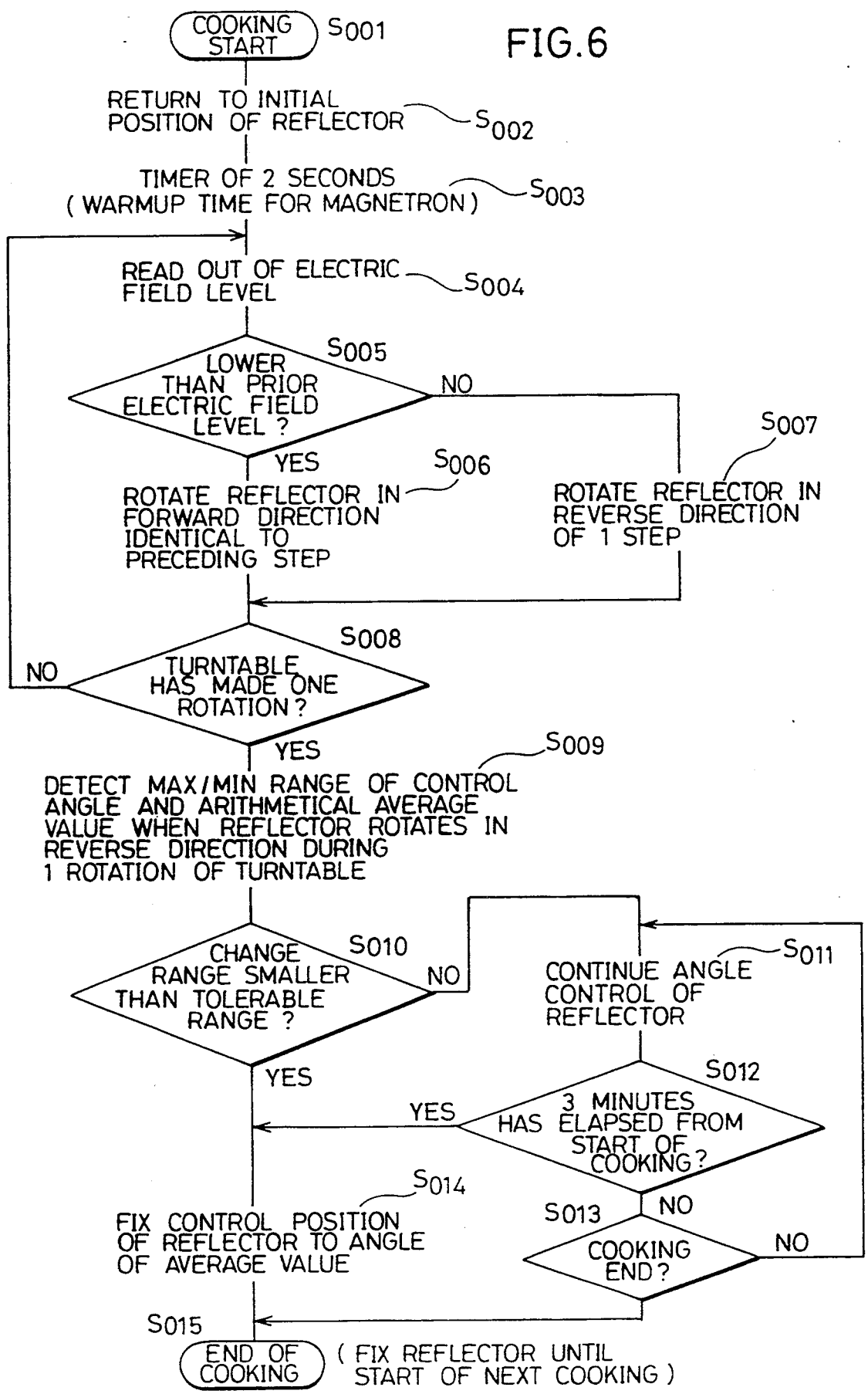
FIG. 6 is a flow chart of the operation of the device of FIG. 5.

FIG. 6 is a flow chart schematically showing the control of the device of FIG. 5.

At step S001, a cooking operation is initiated and the turntable 8 starts rotating. At step S002, reflector 9 returns to a preset initial position. At step S003, a warm up operation of the magnetron is carried out for approximately two seconds by a timer. When the magnetron attains a normal operation state, an electric field level is read for each predetermined angle of the reflector at step S004.

At step S005, a determination is made whether the read out electric field level is lower than the preceding read out level. If YES, reflector 9 is rotated in a forward direction identical to that of one prior step at step S006. Otherwise, reflector 9 is rotated in an opposite direction for one step at step S007.

At step S008, a determination is made whether turntable 8 has made one rotation. If NO, the control returns to step S004, whereby the operation succeeding a read out of an electric field level is continued. If YES, the range obtained from the maximum and minimum control angle and an arithmetical average value when reflector 9 is reversed during one rotation of turntable 8 are detected at step S009.

At step S010, a determination is made whether the above-described changing range is within a tolerable range. If YES, the control position of reflector 9 is fixed at an angle of an arithmetical average, and the operation is continued at step S014. If NO, the operation is continued while the angle control of reflector 9 is carried out at step S011. At step S012, a determination made whether a predetermined time, for example three minutes, has elapsed from the start of the cooking operation. If YES, the control position of reflector 9 is fixed at an angle of an arithmetic coverage value and the operation is continued. If the three minutes has not yet passed, determination is made whether cooking of the food item has been completed at step S013. In the case of food of light load, the cooking will be completed within three minutes, and the control proceeds to step S015. If cooking has not yet been completed, the control returns to step S011, whereby angle control of reflector 9 and the operation are continued.

When cooking is terminated at step S015, reflector 9 is fixed at that position until the start of a next cooking operation. Reflector 9 can be made to return to its initial position.

Referring to FIG. 7, detection of an electric field level is initiated two minutes after initiation of the operation. The time required for one rotation of turntable 8 is 10 seconds, and the control continuation time is 3 minutes.

The curve (A) shows an example of reflector control when soup in a glass pot is heated to be cooked. A relatively large load is placed substantially at the center of turntable 8. There is no great change in the reflector angle. It is appreciated that reflector 9 fixed at an angle of an average value in the heating and cooking operation after one rotation of turntable 8 until the end of the cooking operation.

The curve (B) shows an example of reflector control when coffee in a mug cup is re-warmed. This is a case where a relatively small load is placed at the edge of turntable 8. There is a great variance in impedance of the heating chamber, and the control angle of reflector 9 also changes greatly. The reflector angle control is continued for the predetermined control continuation timer for example three minutes, even after one rotation of turntable 8. In most cases, the cooking is completed within the time of three minutes if the load is small. In this case, cooking is terminated within the continuation time of three minutes. If the cooking exceeds the three minutes, the cooking operation following the three minutes is carried out until it is completed while reflector 9 is fixed at a control angle of an average value of the rotation of a certain period of turntable 8.

Figure 8A:
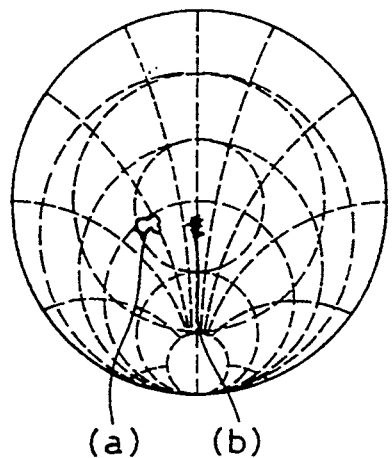
FIGS. 8A, and 8B, and FIGS. 8C and 8D are Smith charts of FIGS. 7(A) and 7(B), respectively.
Figure 8B:
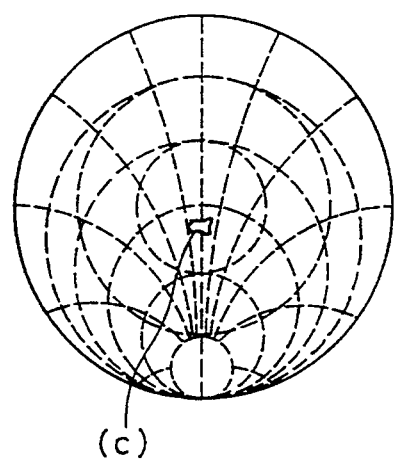
Figure 8C:
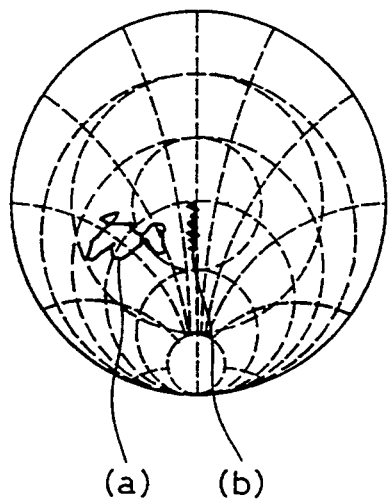
Figure 8D:
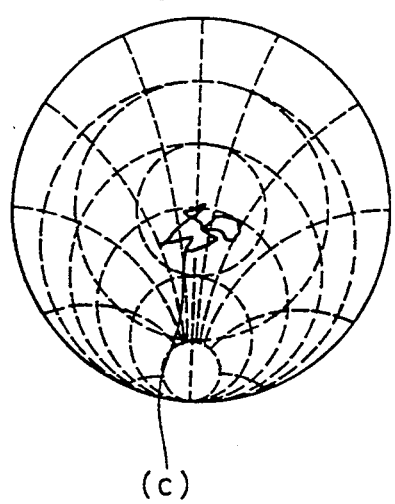

FIGS. 8A and 8B, and FIGS. 8C and 8D show the variance in impedance of the heating chamber according to the load examples of (A) and (B) in FIG. 7 based on a Smith chart. In FIGS. 8A and 8C of impedance variance, (a) shows the case where control is not carried out at an initial position of reflector 9, and (b) shows the case where angle control is carried out for reflector 9. In FIGS. 8B and 8D of impedance variance, (c) shows change in impedance in the case where the reflector angle is fixed to an average value after elapse of a predetermined time.

According to the present embodiment, the usage efficiency of microwave power in a microwave oven can be maintained at its optimum according to the size of a substance to be heated on a turntable and change in the position of load on the turntable. Because the total time required for control and driving the reflector angle for matching impedance can be reduced in comparison with the specified life time total operation time of a microwave oven, components for rotating and driving the reflector can be formed by those that have a normal reliable life time.

Because information can be provided to the user whether the position of the food item placed on the turntable is preferable from the standpoint of usage efficiency of microwave power of the microwave oven, loss in energy can be prevented.

Second Embodiment

Figure 9:
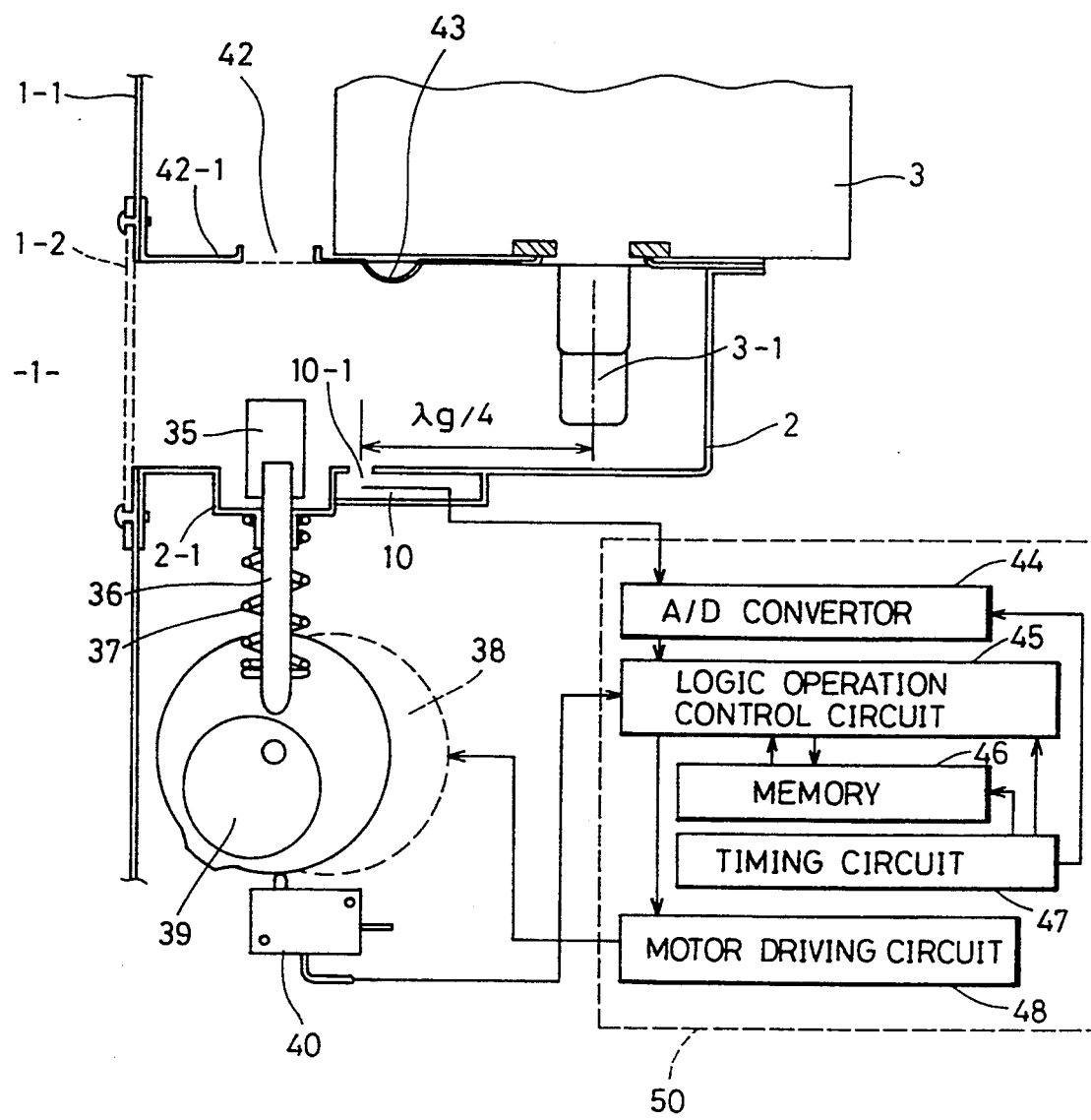
FIG. 9 is a sectional view of a main part of a microwave oven having an embodiment of the present invention.

FIG. 9 is a sectional view of the main part of a microwave oven according to a second embodiment of the present invention.

A magnetron 3 is provided in the interior of the outer box (not shown) of a microwave oven. An antenna 3-1 thereof radiates a microwave into waveguide 2. Waveguide 2 radiates a microwave into heating chamber 1 through an opening covered by an opening cover 1-2 of the wall face 1—1 of heating chamber 1 within the microwave oven.

A concave portion 2-1 and an electric field sensor 10 are provided at the wall face of waveguide 2. A stub 35 attached to a dielectric stub shaft 36 is provided fittedly in concave portion 2-1. Stub shaft 36 is inserted in an arbitrary vertical direction of the bearing at the bottom wall of concave portion 2-1 protruding outwards. The end of stub shaft 36 is always pressed against a cam 39 driven by a motor 38 by means of a spring 37. The circumference of cam 39 is in contact with a stub base position detection switch 40. The outputs of stub base position detection switch 40 and electric field sensor 10 are provided to control circuit 50.

The attached position of the electric field sensor is at the wall face of the waveguide in FIG. 9. However, it may be attached to the wall face of the heating chamber. The electric field sensor should be provided at a position where influence of the electric field of a reflected wave is received, which is obtained by an experiment.

Control circuit 50 includes an A/D converter 44, a logic operation control circuit 45, a memory 46, a timing circuit 47, a motor driving circuit 48 and the like, and are connected as shown in FIG. 9. The operation of control circuit 50 will be described afterwards. An opening 42 for inserting the stub assembly is provided at the wall face of waveguide 2 opposing stub 35. A fixed stub 43 expanding the wall of waveguide inwards, for example, is provided at an appropriate portion of the wall of the waveguide.

Stub 35 for impedance matching is made of a nonmagnetic metal, and is formed having aluminum or copper alloy of 11 mm in diameter and 15 mm in length, for example, fixed to the end of stub shaft 36 of a low dielectric constant dielectric material such as ceramics. In order to prevent discharge between the bottom point of stub 35 and a portion in the proximity of the wall of the waveguide, a concave portion 2-1 of approximately 20 mm in inner diameter and approximately 8 mm in depth that is greater than the diameter of stub 35 by approximately 8 mm is provided expanding outwards in the wall of the waveguide. A portion of stub 35 is accommodated in concave portion 2-1.

The dimension of opening 42 is determined by the combined size of stub 35 and stub shaft 36. For example, the inner diameter is set to be approximately 12 mm depending on the limitation of the height of the circumferential edge provided for preventing microwave leakage. The height of the edge 42-1 is 3 mm. Opening 42 may be supplied with other means to prevent leakage of the microwave.

Motor cam 39 makes one rotation in approximately 4 seconds, for example. The base position of stub 35 is detected by switch 10 for detecting the base position of stub 35 in contact with motor cam 39.

Motor 38 for driving stub 35 is an AC synchronous motor. Motor 38 has its ON-OFF controlled using a photocoupler switching element such as a phototriac or a relay in order to separate the AC power source of the main body from the control circuit 50 of the system by a control unit of the main body (not shown). As described above, switch 40 and electric field sensor 10 respectively provide a signal to control circuit 50.

The circuit structures of the other components of the microwave oven are similar to those of a conventional one.

When a light water load of approximately 300 cc is placed at the center of the turntable tray under the base position (the lowest point of stub 35), the impedance in the heating chamber must be adjusted to attain a maximum magnetron output region. Fixed stub 43 is provided for this purpose. Fixed stub 43 is formed by fixing a metal projection at the inner wall of waveguide 2, or by providing a projection at the wall face of waveguide 2 as shown in FIG. 9.

An opening 10-1 is located approximately $\lambda g/4$ ($\lambda g$:wavelength in waveguide) from antenna 3-1 of magnetron 3. In order to obtain data for controlling the inserting amount of stub 35, electric field sensor 10 for detecting an electric field of the reflected wave within the waveguide senses microwave leaking from opening 10-1 by the antenna of electric field sensor 10. Electric field sensor 10 detects the sensed signal with a high frequency diode which is smoothed with a high frequency capacitor, whereby microwave noise is removed by a lowpass filter. Thus, electric field sensor 10 provides a DC ripple voltage obtained by a high frequency detector circuit. Electric field sensor 10 provides a signal indicating the level of the reflected wave to A/D converter 44 at a timing delayed by approximately 4 msec to 4.5 msec from the voltage zero cross point of the commercial power source. The digital data indicating the level of the reflected wave converted by A/D converter 44 is sent to logic operation control circuit 45.

Figure 11:
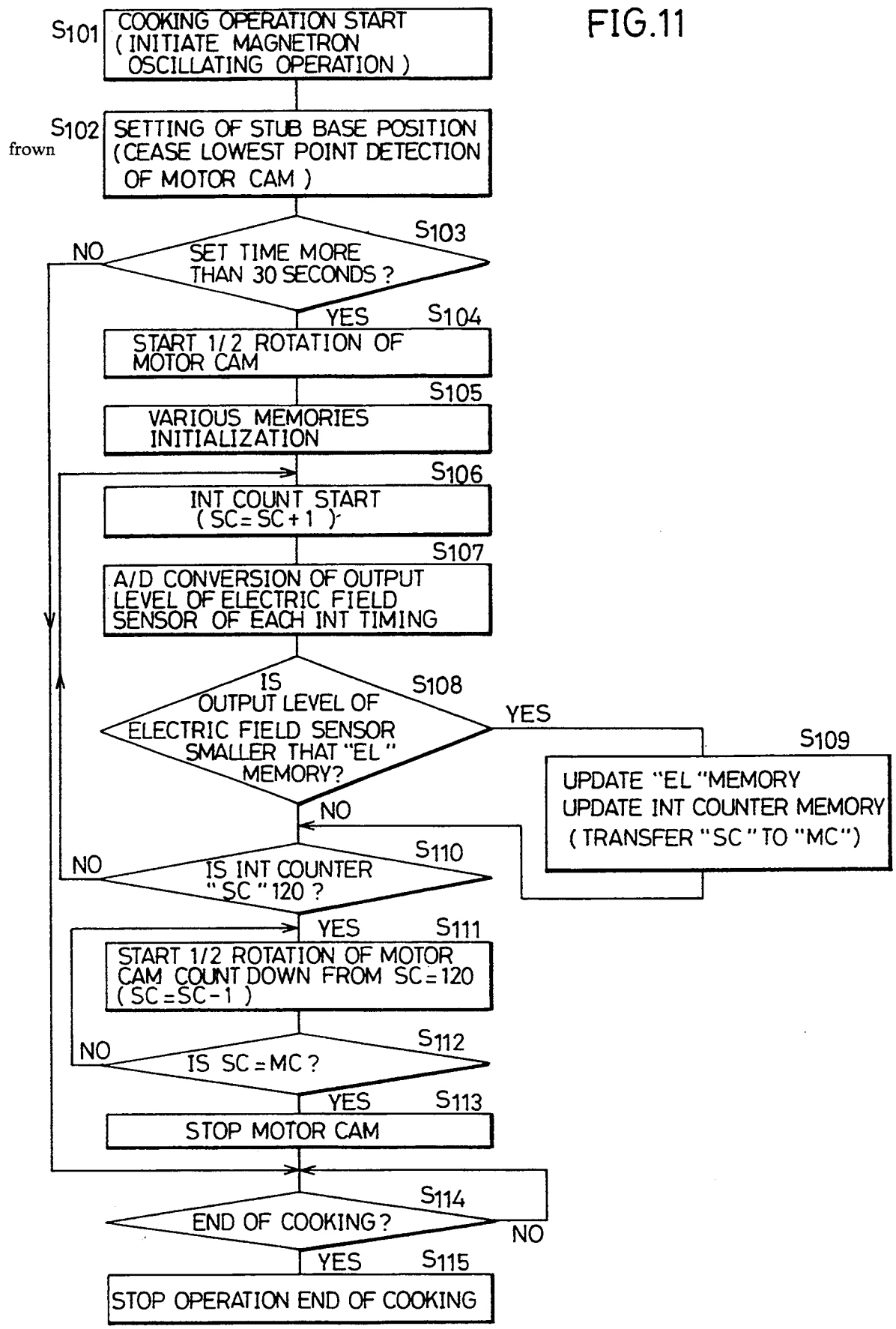
FIG. 11 is a flow chart of the process for setting the length of the stub when the operation time is short.

In logic operation control circuit 45, a control signal based on the flow chart of the motor cam control shown in FIG. 11 is sent to motor driving circuit 48 to set a position of stub 35 after start of an operation of cooking. Required data is stored in memory 46, and a timing signal defining the operation timing of each circuit is provided to each circuit by a timing circuit 47.

Figure 10:
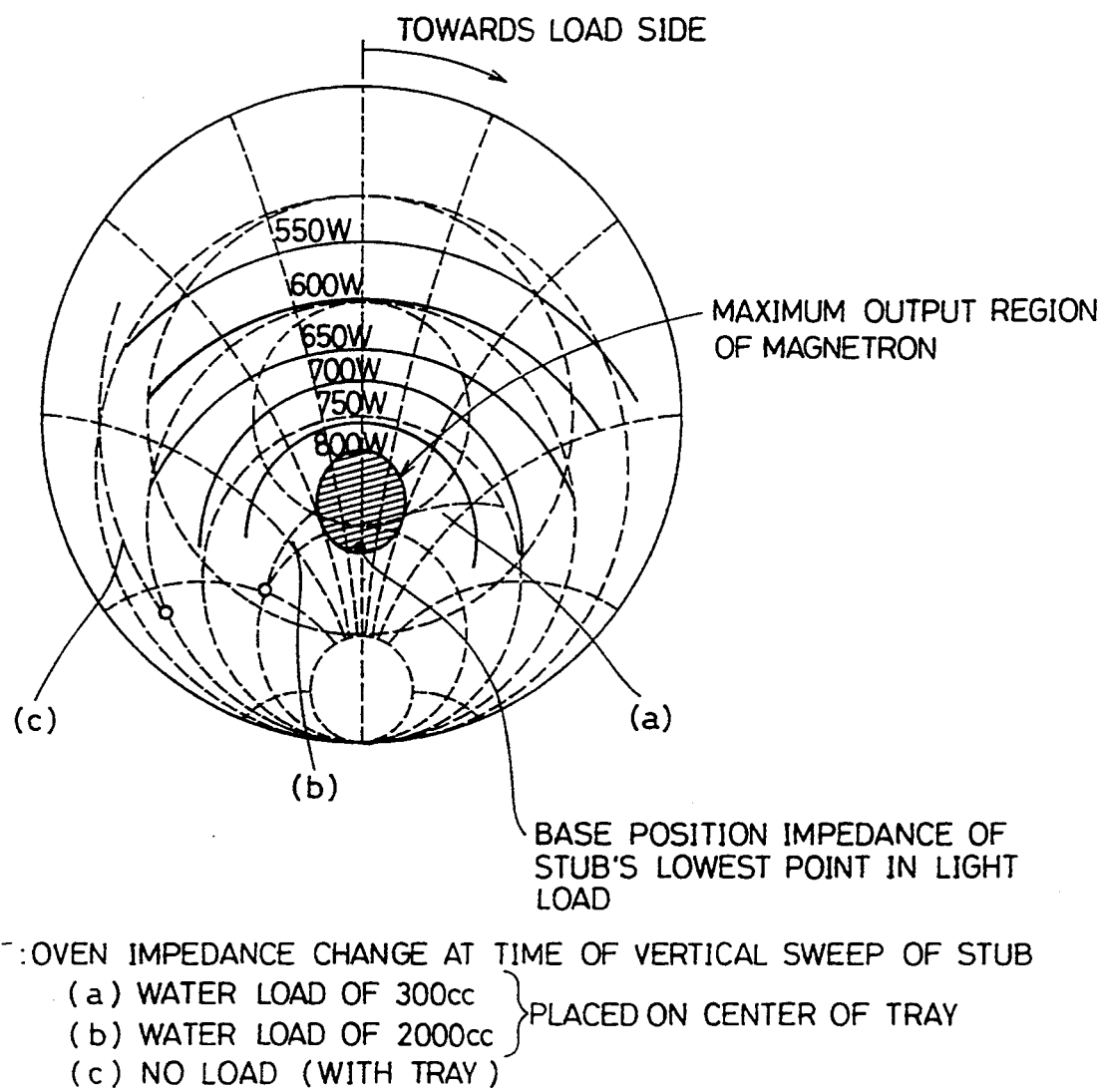
FIG. 10 is a Smith chart showing change in impedance when the stub is moved in the vertical direction of the device of FIG. 9.

FIG. 10 is a Smith chart showing the range of change in impedance in the heating chamber when stub 35 is raised from its base position (lowest point of stub) and inserted into the waveguide.

The base position of the stub 35 is determined so that an optimum impedance can be obtained when the load in the heating chamber at the time of operation is small (corresponding to water load of approximately 300 cc–500 cc) and placed on the center of the tray of the turntable. More specifically, the position of stub 35 is based on an inserted state so as to be in the region where a maximum output is obtained, as shown by the dots (.) of a thick broken line (a) in the Smith chart of FIG. 10.

If the load in the heating chamber is increased, the range of change of impedance by insertion of stub 35 changes as shown in the thick broken line (b) of FIG. 10. The optimum position of stub 35 in the case of water load of 2000 cc is near the highest point. The output of electric field sensor 10 detecting the electric field of the reflected wave within the waveguide shows a minimum value here. If there is no load in the heating chamber, the reflected electric field is high in the waveguide. The range of change of impedance in the Smith chart of FIG. 10 is as shown in the thick broken line of (c).

The lowest points in the respective broken lines of (a), (b) and (c) correspond to the lowest point of stub 35.

At the time of cooking operation, the type, weight and the cooked state of the material of the food, i.e. data required for the operation time is entered. The data is stored in memory 46, whereby magnetron 3 is driven according to this data to obtain maximum efficiency.

FIG. 11 is a flow chart of the process for stub control right after initiation of a cooking operation. The driving conditions of motor cam 39 are as follows. Stub 35 completes one cycle of a rising and a falling operation by one rotation of motor cam 39. When cam 39 makes one rotation in four seconds at a power source frequency of 60 Hz, cam 39 completes one rotation at a count of 240 of the INT (interval) period of the power source. The lowest point of stub 35 is set as the optimum base position in a light load of the heating chamber. If the rotation cycle of motor cam 39 changes, or when the power source frequency changes, for example, to 50 Hz, adjustment of the INT count for one rotation of motor cam 9 is necessary.

The flow chart is described in the following. At the start of operation at step S101, the drive of motor cam 39 is initiated parallel to the oscillating operation of magnetron 3. First, a signal is detected of switch 40 for detecting the base position of stub 35. If not at the base position, motor cam 39 is rotated to move stub 35 until switch 40 operates to complete the base position setting (step S102). Next, a determination is made whether the operation heating time of the entered cooking program is long or short (S103). For example, approximately 30 seconds can be a standard. If the operation heating time is less than 30 seconds, a determination is made that the food cooking is of a light load, and position control of stub 35 is not carried out. The control proceeds to step S114 to complete the cooking operation of the set time.

If the cooking operation time of the entered cooking program is greater than 30 seconds, the control proceeds to step S104. The position of stub 35 is moved by a constant amount. During this move, the optimum position of stub 35 for the load is detected, whereby a program is employed that moves stub 35 to that optimum position. There is no great influence in the average microwave output even if a time period of one rotation at the maximum of motor cam 39 is taken for the optimum position detection and position setting of stub 35. Therefore, motor cam 39 is driven according to the flow chart shown in FIG. 11 (S104). The initial value for each data is stored in memory 46 (S105). The elapse time of a ½ rotation (approximately two seconds) of motor cam 39 and an A/D converted value of the electric field level of the reflected wave in the waveguide obtained by electric field sensor 10 are monitored to obtain a time elapse timing where the detected level of electric field sensor 10 becomes minimum (S106–S110).

Following the former ½ rotation of motor cam 39, the remaining ½ rotation is continued (S111, S112). The value is counted down from the count corresponding to the time of the ½ rotation. Motor cam 39 is stopped at an elapse time of a minimum value of the detected level from electric field sensor 10 obtained by the preceding ½ rotation (S113). If the structure of motor cam 39 is set to correspond to elapse of time in the move in the vertical direction of stub 35, the stub position corresponds to the position where the electric field of the reflected wave is minimum when the control comes to step S113.

The procedure is as follows in the case where the cooking time is long, the cooked state of the food is expected to be at a relatively high temperature (for example more than 80° C.), the cooked food is greatly increased in size from the initial shape, or there is change in the weight during cooking.

Figure 12:
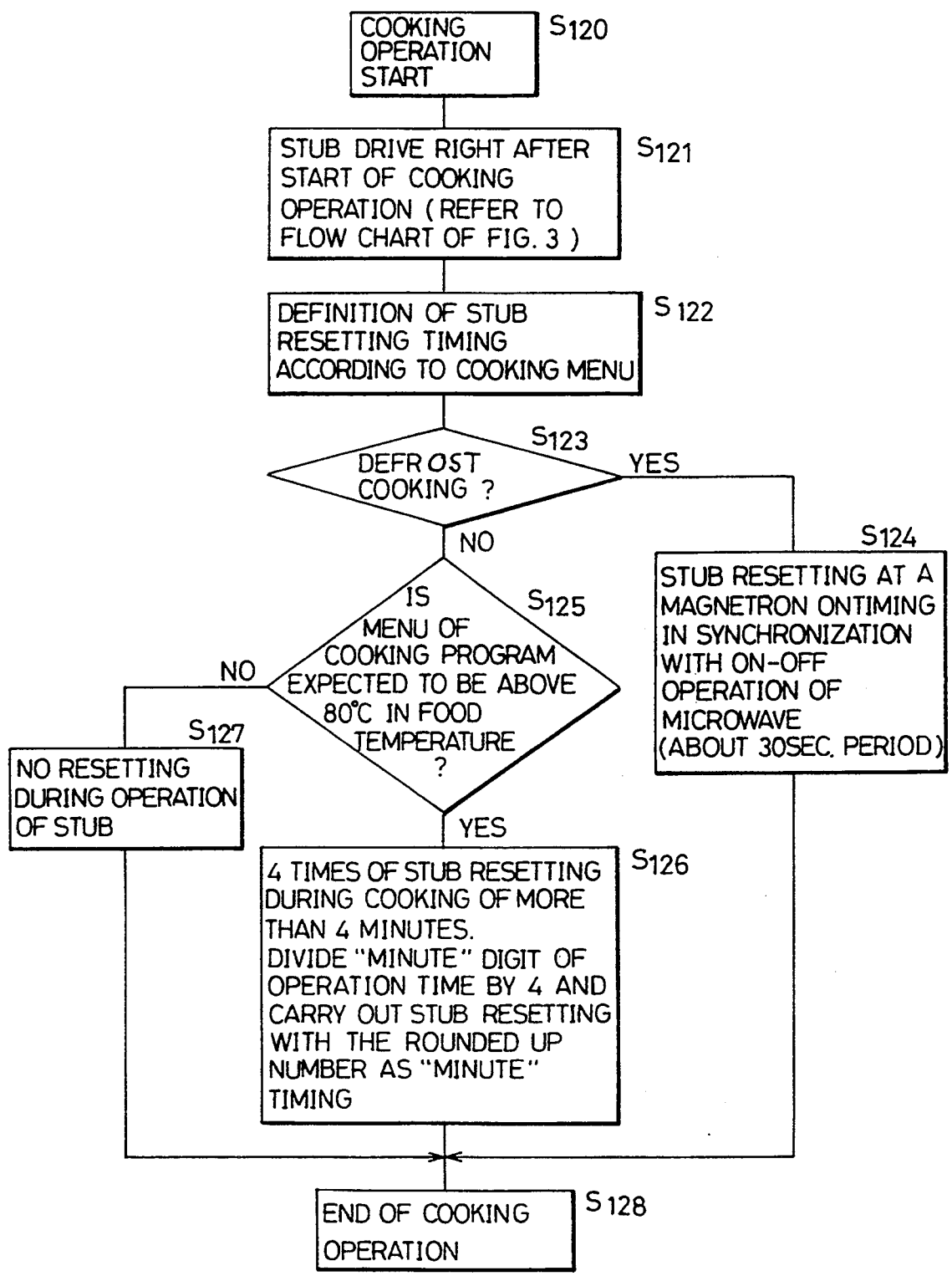
FIG. 12 is a flow chart of the process for setting the length of the stub when the operation time is long.

FIG. 12 shows an example of a flow chart for determining the timing for carrying out resetting of a stub position when the input operation time for cooking is relatively long. Right after initiation of operation, setting of stub 35 is carried out similar to that shown in FIG. 11 (at FIG. 12, S120, S121). In accordance with the remaining operation time and the cooking menu (S122), determination is made whether to maintain the current stub position, to divide the cooking time (divided into four in the example of FIG. 12) to carry out several stub position resetting, or to carry out stub resetting frequently such as in the defrost operation which will be described afterwards to expect effect of microwave mixing (S123–S128).

According to the present invention, impedance matching can be carried out corresponding to the size of the food load, the load position within the heating chamber, and various change in impedance according to the cooked state. Furthermore, the structure of the components of the microwave oven can be simplified to be suitable for mass production while obtaining a structure where arcing and leakage of microwave does not easily occur. According to the position control method of the stub of the present embodiment, a microwave oven of high power efficiency in light load of the heating chamber can be provided. Furthermore, because the stub is driven by an AC synchronous motor and a motor cam rotating in one direction, the cost of the driving mechanism of a stub can be reduced.

Third Embodiment

Figure 13:
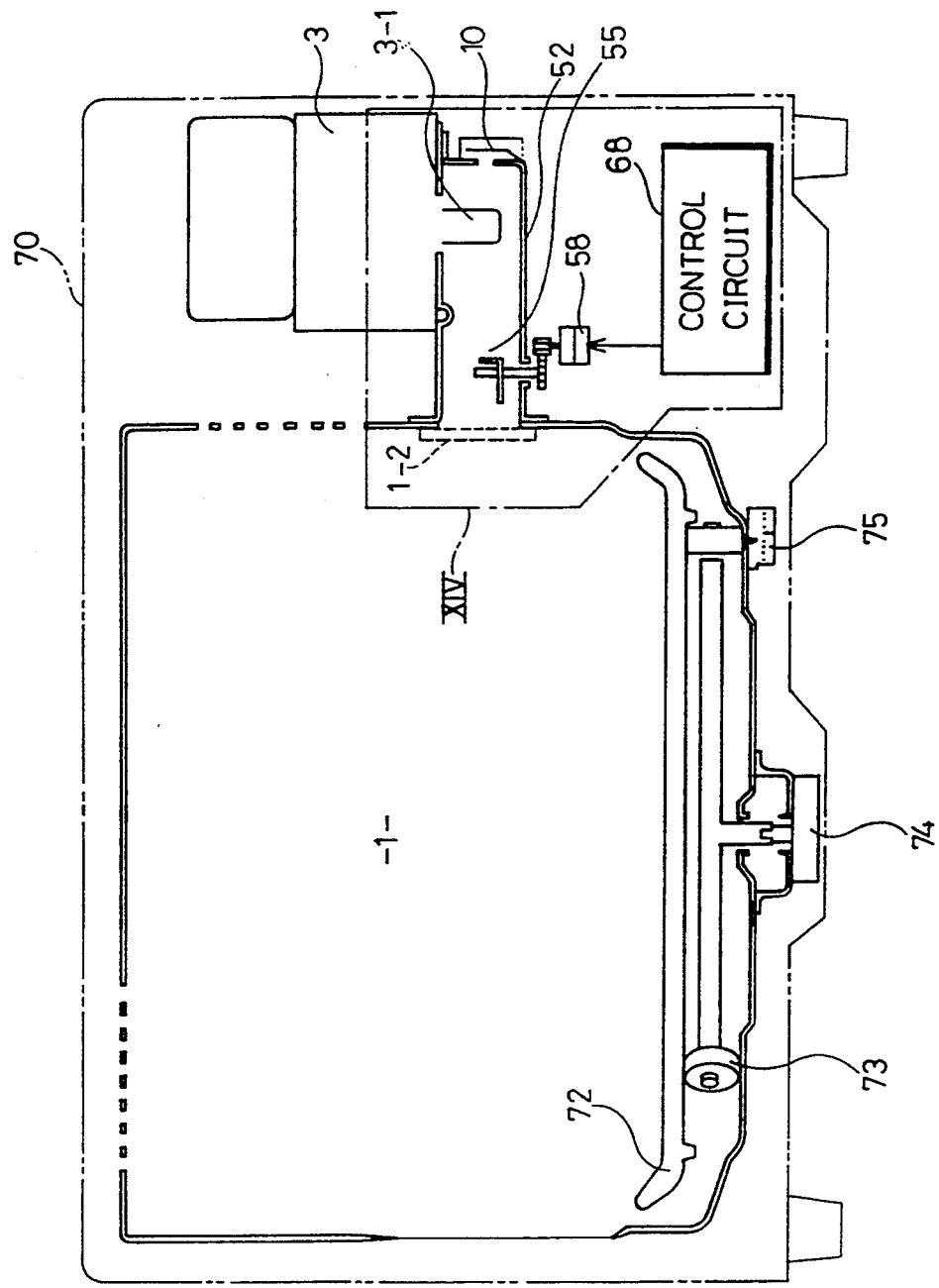
FIG. 13 is a sectional view showing an embodiment of a microwave oven according to the present invention.

FIG. 13 is a sectional view of a microwave oven according to a third embodiment of the present invention. Referring to FIG. 13, a microwave oven having an antenna 3-1 includes a magnetron 3, a waveguide 52 for conducting a microwave radiated from magnetron antenna 3-1 to heating chamber 1, a metal reflector 55 for impedance matching, a motor 58 for rotating metal reflector 55, and a circuit 68 for controlling motor 58. A turntable 72 and a roller 73 for supporting turntable 72 are provided in heating chamber 1. A turntable motor 74 is provided outside heating chamber 1. A weight sensor 75 is provided at a passing point of roller 73. A weight detection signal of weight sensor 75 is provided to control circuit 68.

Metal reflector 55 adjusts impedance of the heating chamber side for impedance matching. Metal reflector 55 is provided within waveguide 52 and is not seen at the time of usage of the microwave oven by an opening cover 1-2.

Magnetron 3 is provided in an outer box 70 of the microwave oven. A microwave radiated from antenna 3-1 passes through waveguide 52 as a traveling wave to be radiated into heating chamber 1 through opening cover 1-2 to reach the food load to be absorbed. According to the state of the food load, a portion of the microwave returns to the interior of waveguide 52 as a reflected wave. The standing wave mode in waveguide 52 changes according to the ratio of the reflected wave to the traveling wave and the state of face thereof to affect the operation efficiency of magnetron 3. In the present embodiment, impedance at the side of the heating chamber seen from magnetron 3 alleviates the influence due to the size of the food load, so that the operation efficiency of the magnetron can be maintained at a high level.

Figure 14:
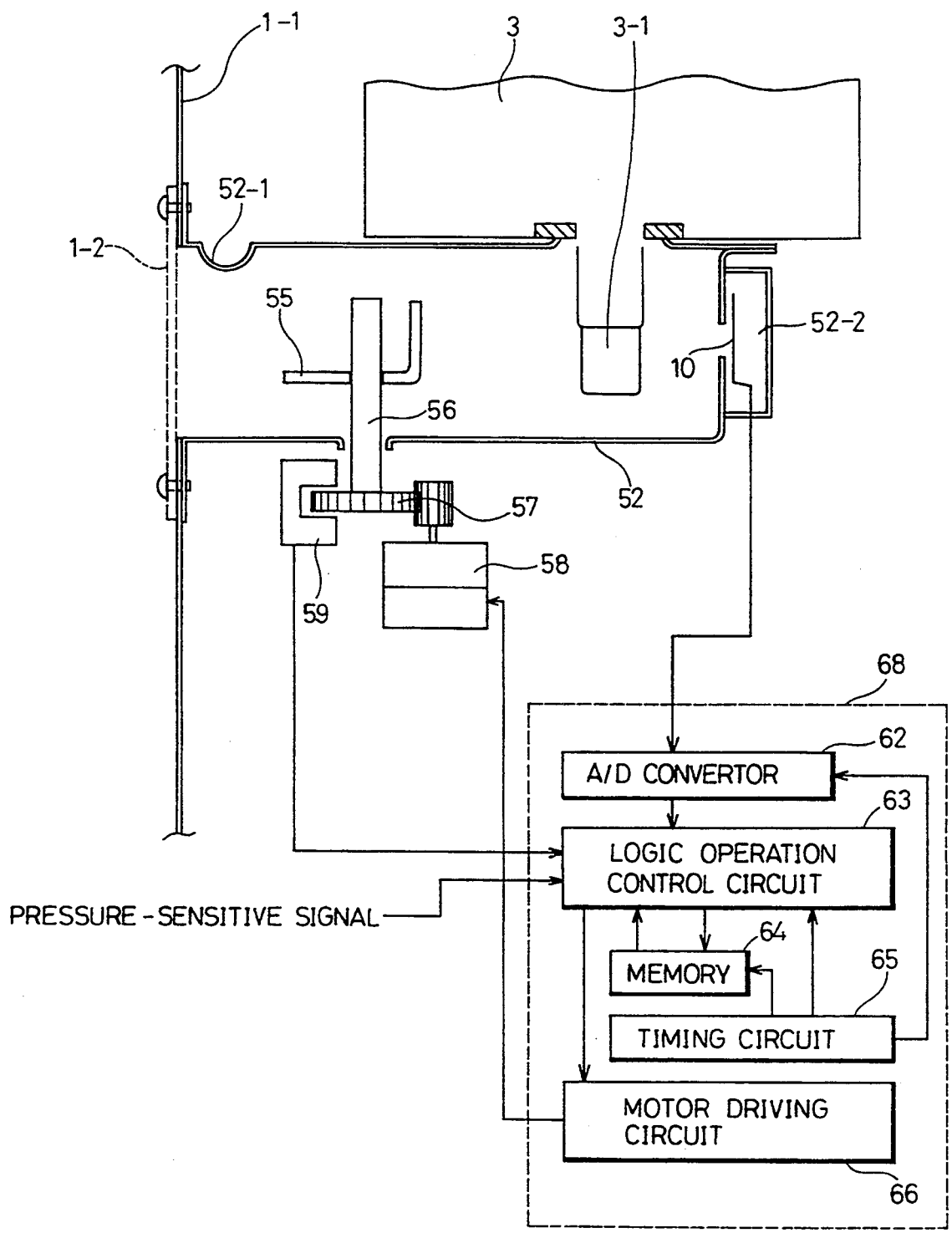
FIG. 14 is an enlarged view of the portion surrounded by a chain dotted line in FIG. 13.

FIG. 14 is an enlarged view of the portion XIV surrounded by a dash dot line of FIG. 13. Referring to FIG. 14, metal reflector 55 is formed of a non-magnetic metal. Metal reflector 55 is fixed to a dielectric rotation shaft 56 formed of a low dielectric constant of dielectric material such as ceramics and plastic. Dielectric rotation shaft 56 is connected to a driven gear 57 outside waveguide 52. Driven gear 57 has its position of angle controlled by motor 58. A hole is formed in the proximity of the circumference of driven gear 57. A photo interrupter 59 is provided corresponding to the position of this hole. Photo interrupter 59 detects the position of the base angle of metal reflector 55.

Motor 58 is a compact generalized type stepping motor dividing one rotation into 20 steps. By combining a reduction gear, a general compatible direct current motor may be used as motor 58. In this case, a photo interrupter can be added, whereby the rotation angle of metal reflector 55 can be set to 20 steps per rotation or 40 steps per rotation by an additional photo interrupter and a rotation hole disk attached to a motor shaft.

Control circuit 68 includes an A/D converter 62, a logic operation circuit 63, a memory 64, a timing circuit 65 and a motor driving circuit 66. An A/D converter 62 converts the analog signal indicating the level of the electric field detected by electric field sensor 10 into a digital signal. Logic operation circuit 63 processes the digital data from A/D converter 62 according to the flow charts of FIGS. 21 and 22 which will be described afterwards. Memory 64 stores a tolerable range of the optimum control target value of an electric level selected in advance so that the reflected wave takes a minimum value. Timing circuit 65 generates a timing signal for controlling the A/D conversion timing of A/D converter 62 and the operation timing of logic operation control circuit 63. Motor driving circuit 66 responds to the operation result of logic operation control circuit 63 to control the rotation angle of motor 58.

Electric field sensor 10 fixed to the outer side 52-2 of the terminal end of waveguide 52 detects the intensity of the electric field in waveguide 52. Electric field sensor 10 senses the level of the microwave leaking from a hole of approximately 4.5 mm diameter provided substantially at the center of the termination end portion. The termination portion of waveguide 52 is located at 1/8 the distance of the wavelength in the waveguide from antenna 3-1. Electric field sensor 10 includes an electric field detecting antenna, a high frequency diode, a high frequency capacitor and a lowpass filter, as in a conventional high frequency detection circuit. A microwave is detected by the electric field detection antenna to be detected by the high frequency diode to be smoothed by a high frequency capacitor, whereby microwave noise is removed by the lowpass filter. Thus, a DC ripple voltage indicating the intensity of the electric field is provided from electric field sensor 10.

The A/D conversion of A/D converter 62 is carried at a timing delayed by approximately 4 m seconds to 4.5 m seconds from the voltage zero cross point of the power source voltage where the maximum power is obtained in the oscillating operation of magnetron 3. The obtained data of the electric field level is supplied to logic operation control circuit 63. The stub which is the induction component is based on the angle position of metal reflector 55 which most closely approximates antenna 3-1. When light load of water of approximately 300 cc is placed at the center of turntable 72, impedance at the heating chamber side is within the output maximum region of magnetron 3. A projection 52-1 is provided at the wall face of waveguide 52 to form a fixed stub for impedance adjustment. The fixed stub may have a metal projection fixed at the wall face of the waveguide.

Figure 15:
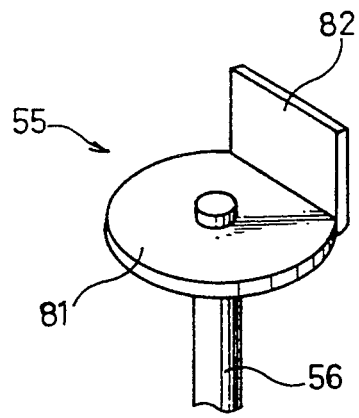
FIG. 15 is a perspective view showing an example of the metal reflector of FIG. 14.

FIG. 15 is a perspective view showing an example of the metal reflector 55 of FIG. 14. Referring to FIG. 15, metal reflector 55 includes a metal disk 81, and a metal plate 82 provided at the circumferential edge of metal disk 81. Metal disk 81 is formed of a non-magnetic metal such as aluminum whose surface loss of microwave is low. Metal disk 81 has its center portion supported and fixed to a dielectric rotation shaft 56 formed of a low dielectric constant material such as ceramics and plastic. The diameter of metal disk 81 is 30 mm–40 mm which approximates the wavelength of the microwave approximately $\lambda g/4$. Although the height of metal plate 82 depends on the height of waveguide 52, a height of 15 mm–20 mm approximating $\mu g/8$ of the wavelength of the microwave is selected.

The formation of metal reflector 55 as shown in FIG. 15 is set forth in the following. A metal plate 82 is formed at the end of metal disk 81, and metal plate 82 is bent. Metal disk 81 mainly becomes the capacitance component of impedance, and metal plate 82 becomes mainly the induction component of impedance.

Figure 16:
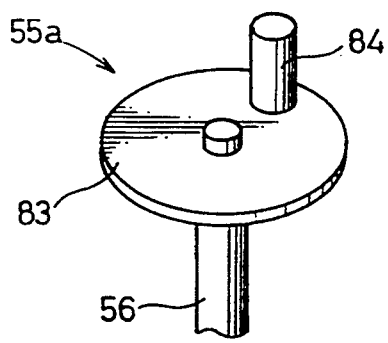
FIG. 16 is a perspective view showing another example of the metal reflector of FIG. 14.

FIG. 16 is a perspective view showing another example of metal reflector 55. Metal reflector 55a shown in FIG. 16 includes a metal disc 83, and a metal cylindrical stub 84 attached to metal disc 83. Metal disc 83 and metal cylindrical stub 84 mainly become the capacitance component and the induction component, respectively, of the impedance.

Figure 17A:
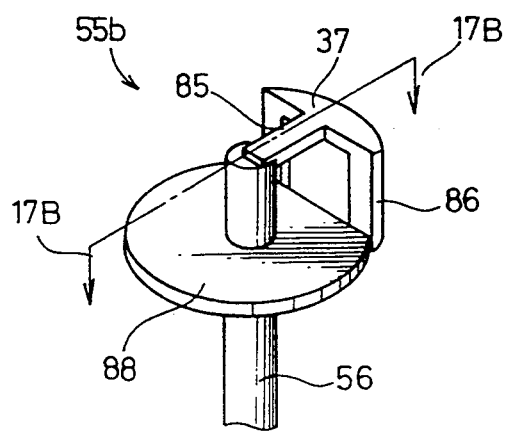
FIG. 17A shows a further example of the metal reflector of FIG. 14.
Figure 17B:
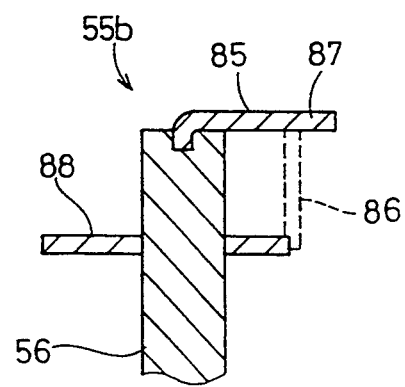
FIG. 17B is a sectional view taken in the direction of arrow 17B—17B of FIG. 17.

FIGS. 17A and 17B show a further example of metal reflector 55. Metal reflector 55b of FIGS. 17A and 17B include a metal disk 88, a metal face 86, an edge 87 and a support portion 85. Metal disk 88 and metal face 86 mainly become the capacitance component and the induction component of the impedance component. The end of supporting portion 85 is attached to dielectric rotation shaft 56. This facilitates the fixing of metal reflector 55b to dielectric rotation shaft 56, and impedance can be adjusted in a greater range.

Figure 18:
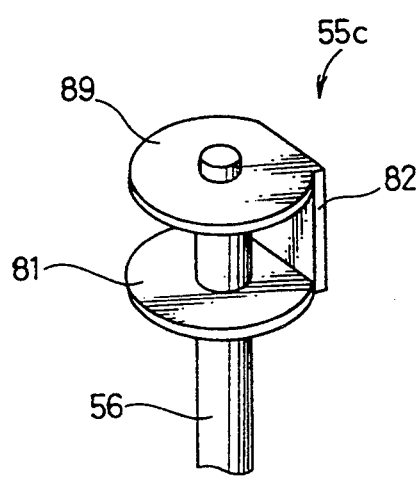
FIG. 18 is a perspective view of still another example of the metal reflector of FIG. 14.

FIG. 18 is a perspective view of a metal reflector of still another example. Metal reflector 55c of FIG. 18 is similar to that of FIG. 15 except that a metal disk 89 is added to metal reflector 55. Thus, the electrostatic coupling condition of metal reflector 55c and the sidewall of the waveguide can be changed from that of FIG. 15.

Figure 19A:
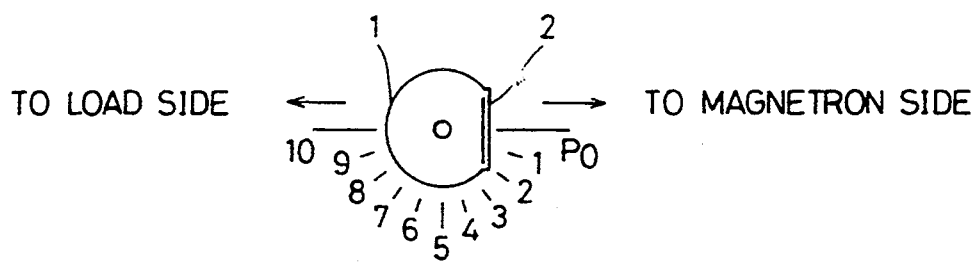
FIG. 19A schematically shows the angular position of a metal reflector.
Figure 19B:
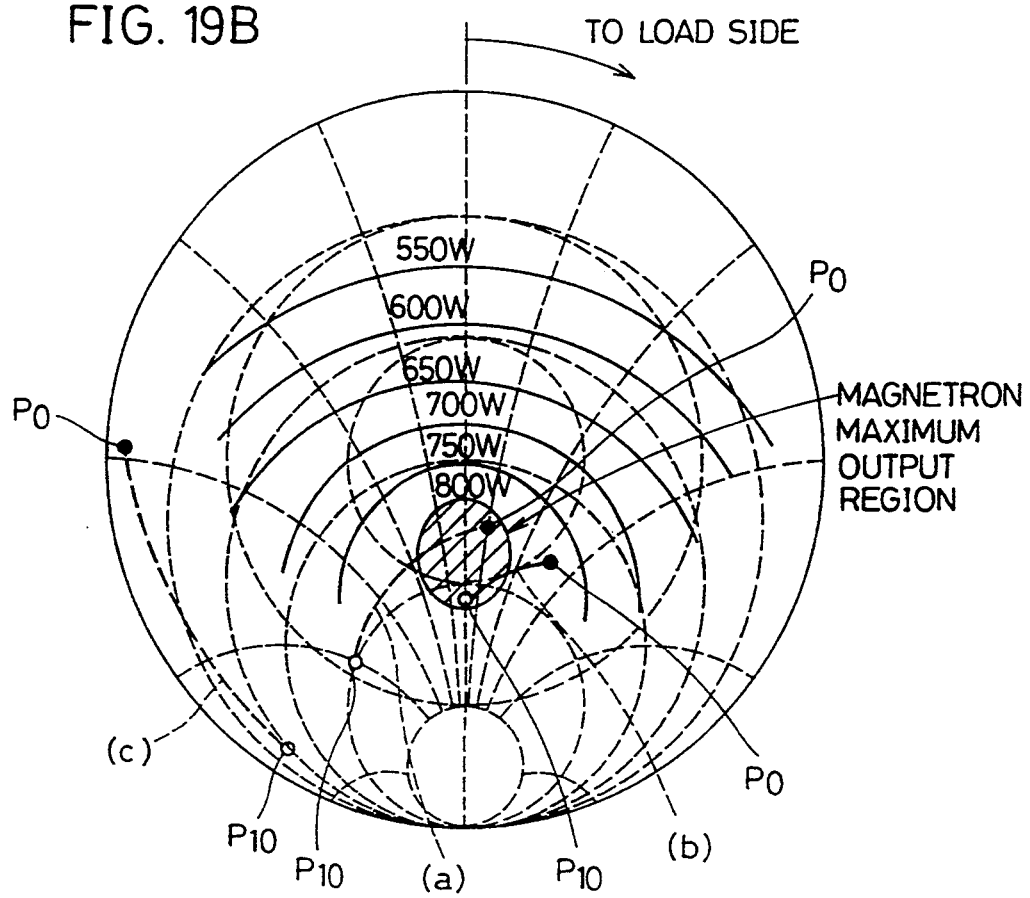
FIG. 19B is a Smith chart for describing the impedance varying range according to the control of the position of the metal reflector 55.

Referring to FIG. 19A, the base position of metal reflector 55 (FIG. 15), i.e. the angle position of metal reflector 55 where metal plate 82 is closest to the magnetron is "P0". 180° is divided into 10 resulting in 18° for each position, and the angle position of metal reflector 55 corresponding to each angle is set as from "P1" to "P10". The impedance at the heating chamber side in the rotating metal reflector 55 from the base angle position to 180° is plotted on the Smith chart in FIG. 19B. Referring to FIG. 19B, curve (a) shows the case where a water load of 300 cc is placed at the center of the turntable, curve (b) shows the case where a water load of 2000 c is placed at the center of the turntable, and curve (c) shows the case of no load. The hatched area on the Smith chart indicates the maximum output region of the magnetron.

The standard state is when metal reflector 55 is at its base angle position "P0", and when a light load corresponding to 300 cc of water load is placed at the center of turntable 22. The position and height of fixed stub 52-1 (FIG. 14) is determined under this standard state such that impedance in heating chamber 1 is within the region when maximum output is obtained such as point "P0" of curve (a) on the Smith chart.

If the load in heating chamber 1 is increased, the range of impedance change in the heating chamber side due to rotation of metal reflector 55 changes. As a result, the optimum angle position of metal reflector 55 becomes the state of "P10" which is approximately 180° rotated from the base position, in the case of load of 2000 cc calculated in water load, as shown in curve (b) of FIG. 19B.

The output level of electric field sensor 10 is obtained by experiment in advance under the state where electric field sensor 10 is provided at the end portion of the waveguide as shown in FIG. 14 and magnetron 3 operated under the conditions where the load is set so that the reflected wave is minimum. This output level is the reference value Eref of the output level. Reference value Eref is described in detail hereinafter.

The output level of electric field sensor 10 correlates to the intensity of the electric field in the proximity of the inner wall face of waveguide 52. The condition for no reflected wave is when the impedance of the heating chamber side seen from magnetron 3 coincides with the impedance of magnetron 3 which is the microwave generating source. Since the output level of electric field sensor 10 approximates the reference value Eref, this reference value Eref is the optimum control target value. The impedance at the heating chamber side changes according to change of the food load within heating chamber 1, and takes a value greater or smaller than the impedance of magnetron 3. Accordingly, the electric field level of the standing wave in the proximity of electric field sensor 10 also becomes higher or lower. The output level of electric field sensor 10 also takes a value higher or lower than the reference value Eref. The middle region of the Smith chart of FIG. 19B is where there is no reflected wave. The standing wave ratio is 1 at that middle region.

Therefore, by controlling the angle position of metal reflector 55 so that the output level of electric sensor 10 approximates the reference value Eref, magnetron 3 can be operated in an optimum impedance region.

Referring to FIG. 20, it is presumed that a light load is to be heated right after initiation of a cooking heating operation regardless of the weight of the food in the control of heating cooking. Position "P0" is selected for the angle position of metal reflector 55. After weight information of food is received from weight sensor 75, control circuit 68 rotates metal reflector 55 promptly to an optimum angle position according to the relation shown in FIG. 20.

Figure 21:
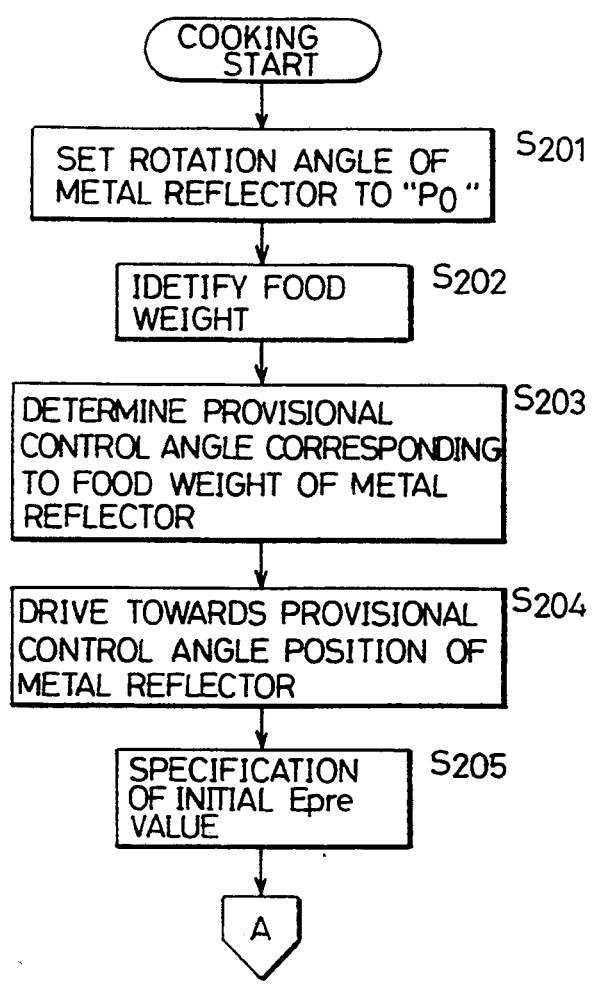
FIG. 21 is a portion of a flow chart showing the control of a metal reflector from the start to the end of a cooking operational mode.
Figure 22:
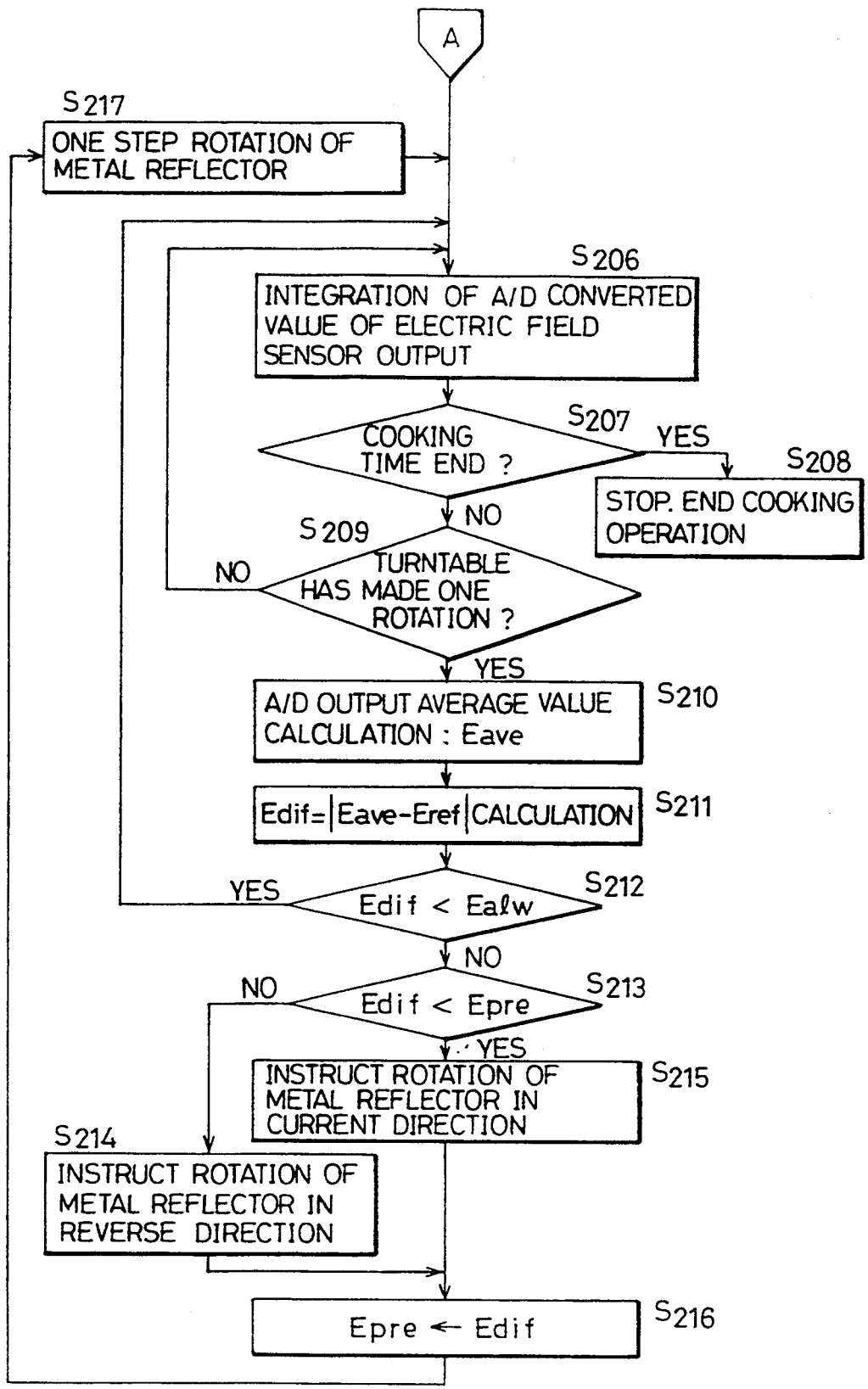
FIG. 22 is a portion of a flow portion showing the control of a metal reflector from the start to the end of a cooking operational mode.

Referring to FIGS. 21 and 22, control of the angle position of metal reflector 55 will be described. In FIGS. 21 and 22, Eave is the average value of the detected level of electric field sensor 10 during one rotation of turntable 22, Edif is the absolute value of the difference between the average value Eave and the reference value Eref, Ealw is the tolerance range with respect to the absolute value Edif, and Epre is the preceding measured Edif value.

At step S201, the angle position of metal reflector 55 is moved to the base position "P0". At step S202, a pressure-sensitive signal (weight data) is entered from weight sensor 75. At step 203, a provisional control angle of metal reflector 55 is determined according to the relationship of FIG. 20. At step S204, metal reflector 55 is moved to that angle position.

Referring to FIG. 22, the reflected electric field level detected by electric field sensor 10 is converted into digital data by A/D converter 62, and integrated by logic operation control circuit 13 at step S206.

At step S207, a determination is made whether the cooking time has ended or not. If the cooking time has ended, the control proceeds to step S208 to cease and end the cooking operation. If the cooking time has not yet ended, the control proceeds to step S209 where a determination is made whether turntable 72 has made one rotation. If a determination is made that one rotation has not been made, the control returns to step S206. Otherwise, the control proceeds to step S210.

At step S210, the average value Eave is obtained from the integrated result of the output data of A/D converter 2 during one rotation of turntable 72.

At step S211, the absolute value Edif which is the difference between the average value Eave and the reference value Eref is obtained.

At step S212, a determination is made whether the absolute value Edif is smaller than tolerable range Ealw. If Edif<Ealw, the control returns to step S206, otherwise to step S213. At step S213, a determination is made whether the absolute value Edif is smaller than Epre. IF Edif>Epre, the control proceeds to step S214. At step S214, an instruction is sent to motor driving circuit 66 to reverse the direction of rotation of metal reflector 55. If not Edif>Epre, the control proceeds to step S215 where an instruction is sent to motor driving circuit 66 to rotate metal reflector 55 in the current specified direction.

The initial direction of rotation of metal reflector 55 is assumed to be clockwise. A sufficiently large value is set as the initial value for Epre.

At step S216, the Epre held in memory 64 is replaced by a newly calculated absolute value Edif.

At step S217, motor 58 is driven to rotate metal reflector 55 for one step in a direction determined at step S214 or S215. Then, the control returns to step S206.

Figure 23A:
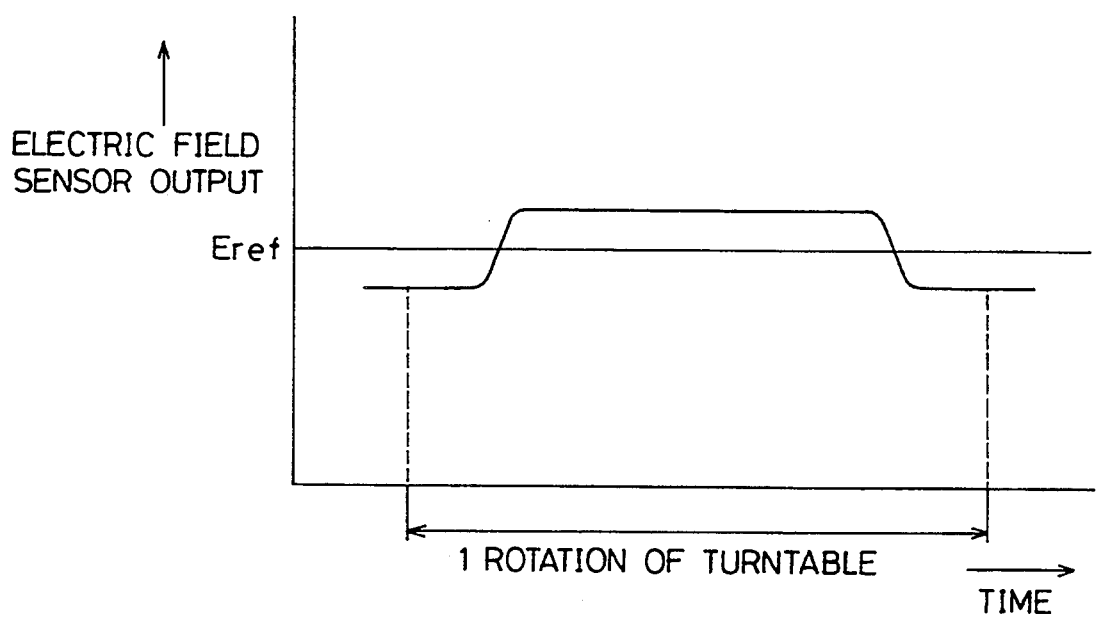
Figure 23B:
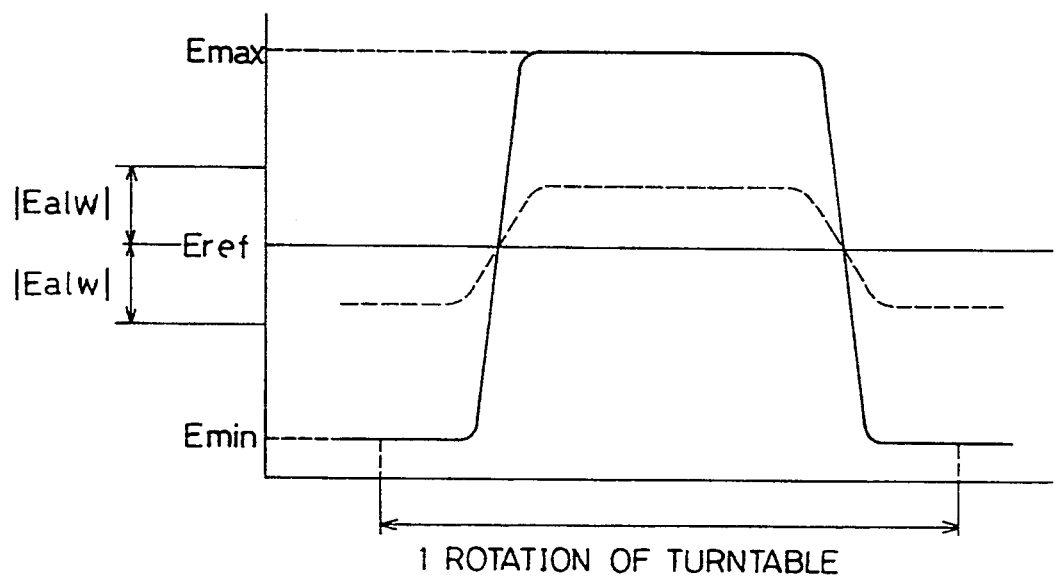

It is to be noted that the output value of electric field sensor 10 changes during one rotation of turntable 72, as shown in FIGS. 23A and 24B. FIG. 23A and FIG. 23B show the cases where the changing range of the output value are small and great, respectively. In the case of FIG. 23A, the output value of electric field sensor 10 approximates the reference value Eref which is the optimum control target value, so that heating of high power efficiency can be carried out. In the case of FIG. 23B, it can be appreciated from the solid line that although the average value Eave approximates the reference value Eref, each value over time is far from the reference value Eref. This means that although the average value Eave is equal, the efficiency is poor in comparison with the case of FIG. 23A. The heating efficiency can be improved by controlling the active impedance by approximating the output values Emax and Emin of electric field sensor 10 to the reference value Eref as shown in the broken line of FIG. 23B.

Figure 24:
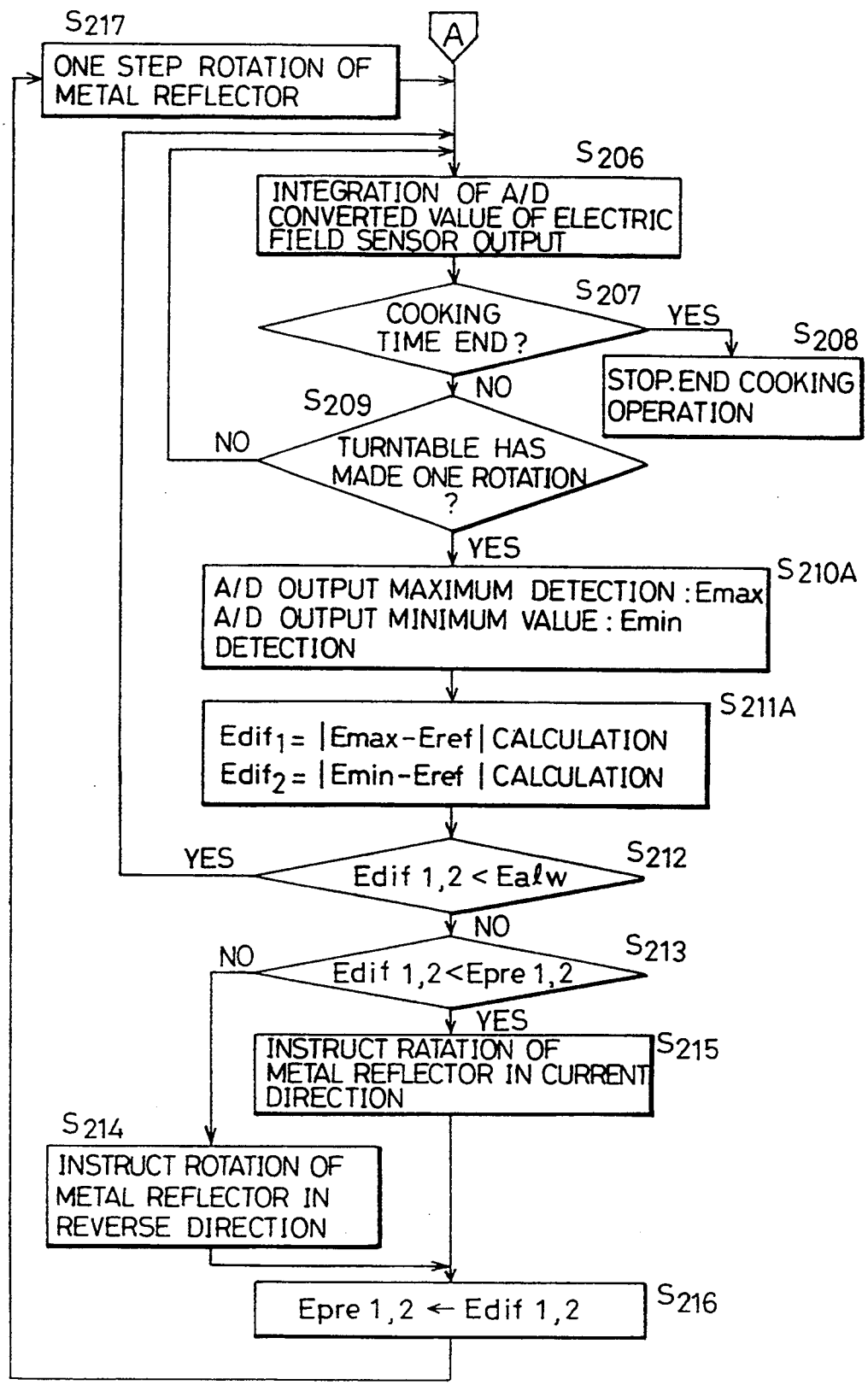
FIG. 24 is a flow chart showing another embodiment of an active load matching system according to the present invention.

FIG. 24 is a modification of the flow chart of FIG. 22. This flow chart is directed to improving the heating efficiency described above with reference to FIGS. 23A and 23B. Steps S210A and S211A in the flow chart of FIG. 24 differs from step S210 and S211 in the flow chart of FIG. 22.

Referring to FIG. 24, a microwave oven under this modification operates as follows.

An output signal of electric field sensor 10 is A/D converted by A/D converter 62, and integrated for one rotation of turntable 72 by the procedures of steps S206–S209.

At step S210A, the maximum value Emax and the minimum value Emin of the A/D converted data during one rotation of turntable 72 are detected.

At step S211A, absolute values Edif 1 and Edif 2 of the difference between the maximum and minimum values Emax and Emin and the reference value Eref are obtained. The appropriate control state is where absolute values Edif 1 and 2 are within the tolerable range of Ealw.

At step S212, a determination is made whether absolute values Edif 1 and 2 are below the tolerable range, i.e. Edif 1 < Ealw, and Edif 2 < Ealw. If the result of the determination is YES, the control returns to step S206, otherwise to step S213. Then, the newly obtained absolute values Edif 1 and 2 are compared respectively with Epre 1 and 2 indicating the Edif 1 and 2 of the prior rotation of one step. Specifically, at step S213, a determination is made whether the output value of electric field sensor 10 comes nearer to or farther from the appropriate control value. According to the result of this determination, the direction of the angle control of the next step is specified (S214, S215). The procedures of steps S206–S217 are sequentially executed for each rotation of turntable 72 to maintain the appropriate control state.

According to the microwave oven of the above embodiment, the metal reflector includes a metal face which becomes mainly the capacitance component and a stub which becomes mainly the induction component, and the position of the stub can be changed, whereby impedance at the heating chamber side can be changed as desired. The combination of a metal face and a stub can be selected so as to prevent arcing between the metal reflector and the wall face of the waveguide and to prevent microwave leakage.

According to the microwave oven of the present embodiment, impedance matching is automatically carried out corresponding to variation of the size of the food load to be heated and cooked, the position of the food load in the heating chamber, and the change in impedance at the heating chamber side according to the cooked state of the food, whereby the microwave power efficiency can be maintained as desired.

Fourth Embodiment

Figure 25:
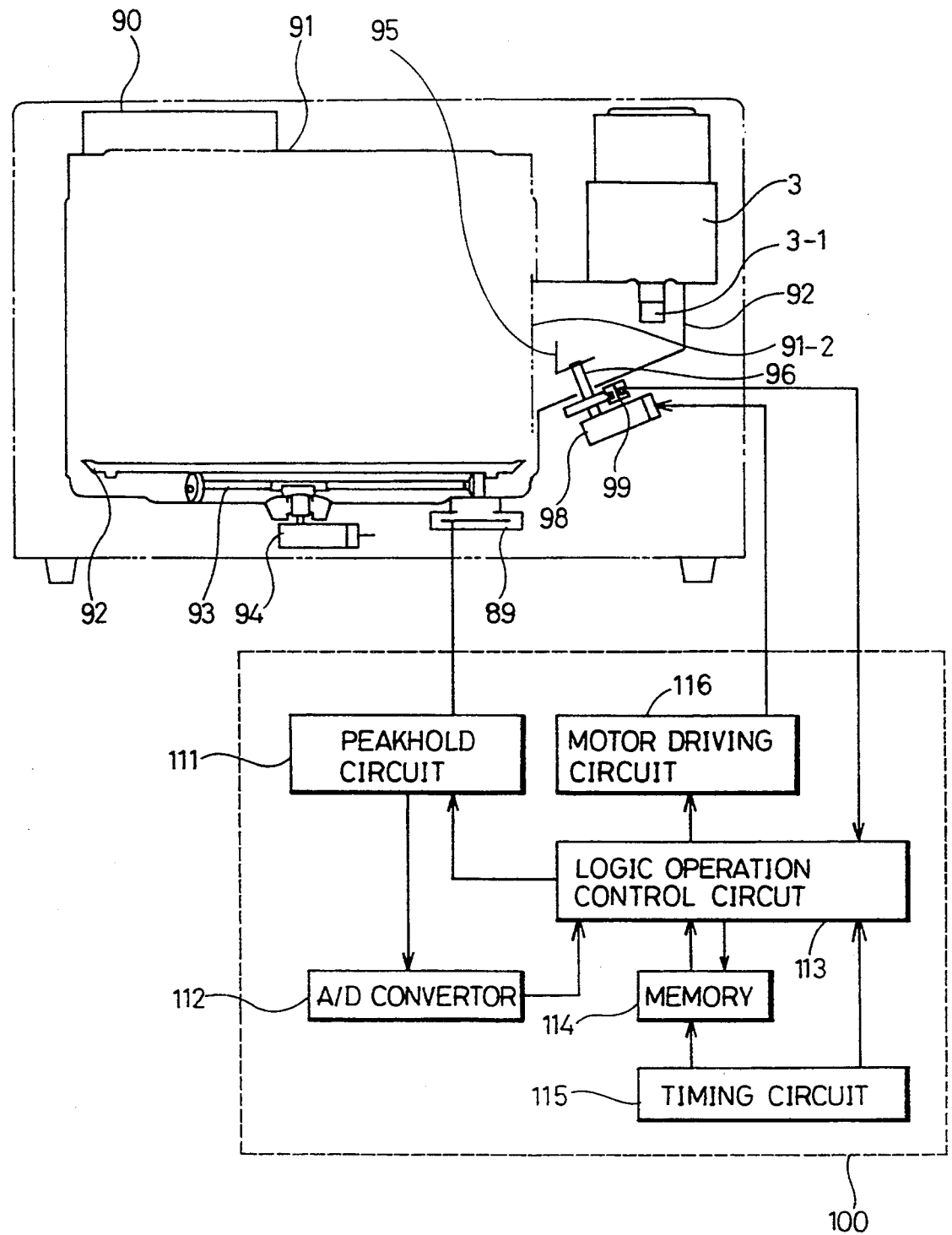
FIG. 25 is a vertical sectional view showing an embodiment of a microwave oven according to the present invention.
Figure 26:
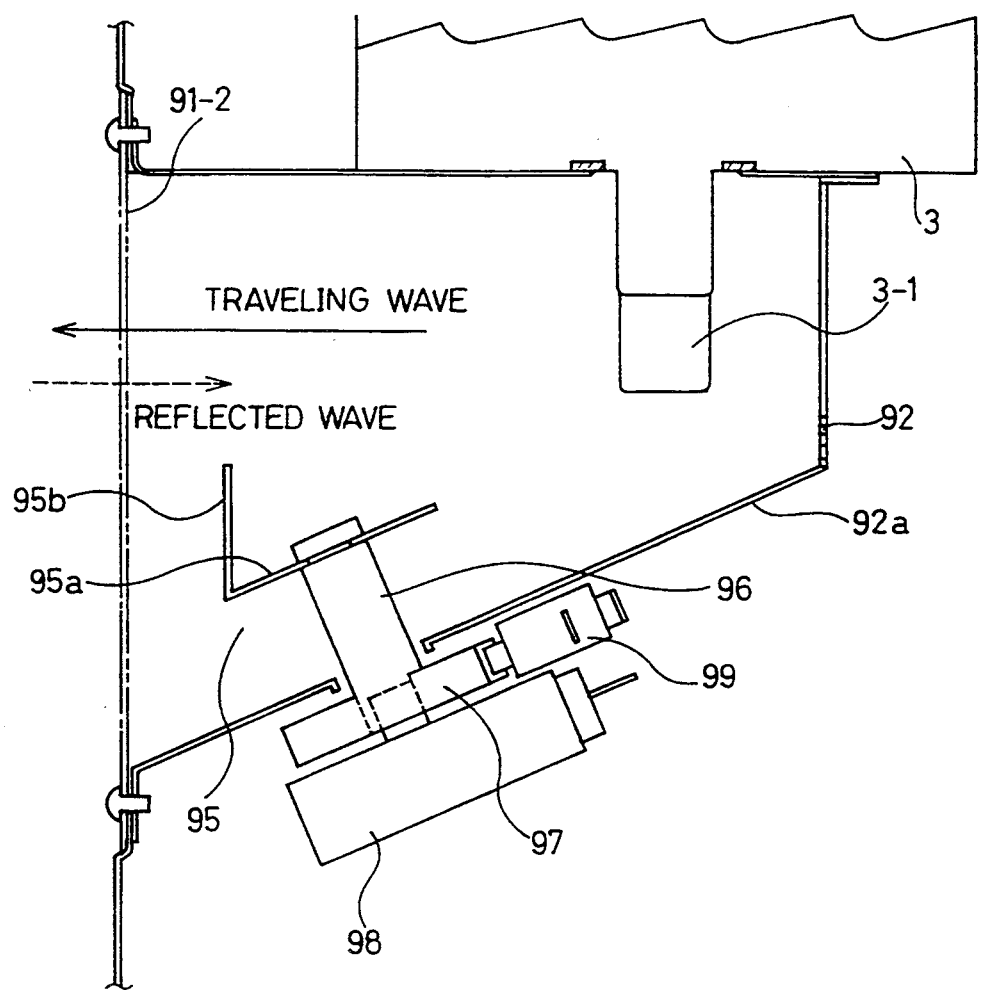
FIG. 26 is an enlarged diagram of the waveguide portion of FIG. 25.
Figure 27:
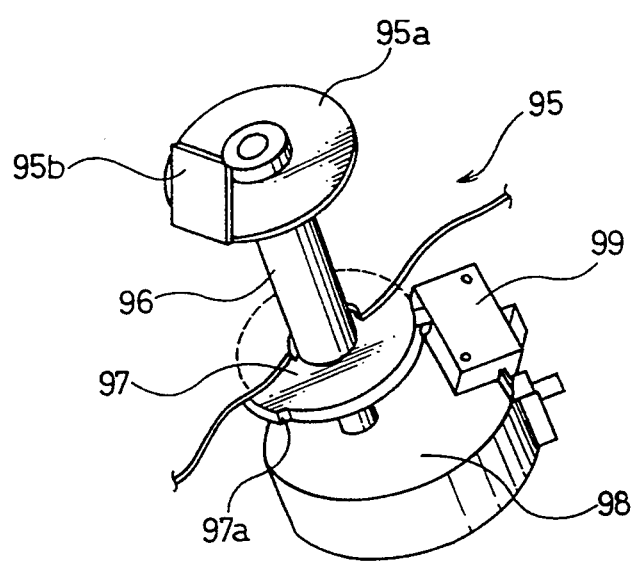
FIG. 27 is a perspective view of a metal reflector provided at the bottom of a waveguide.

Referring to FIGS. 25–27, a microwave oven of a fourth embodiment of the present invention includes a magnetron 3 having an antenna 3-1, a waveguide 92 for conducting into an oven 91 the microwave radiated from antenna 3-1, an opening cover 91-2, a metal reflector 95 for impedance matching, a motor 98 for driving metal reflector 95 via a plastic rotation shaft 96, a switch 99 for detecting the base position of the rotation of metal reflector 95, a control circuit 100 for controlling the entire microwave oven including impedance matching control, an outer box 90, a heating chamber 91, a turntable 92, a support roller 93, a turntable motor 94, a piezoelectric weight sensor 89, and a door (not shown) attached to the opening of heating chamber 91 to open and close the chamber. Metal reflector 95 is disposed within waveguide 92, and cannot be seen from the heating chamber 91 side owing to opening cover 91-2. Magnetron 3 provided in outer box 90 radiates a microwave into waveguide 92 from antenna 3-1.

The microwave radiated from antenna 3-1 passes through waveguide 92 as a traveling wave to be radiated through opening cover 91-2 to the interior of heating chamber 91. The microwave reaches the food load and is absorbed. A portion of the microwave returns to the interior of waveguide 92 according to the state of the food load. The mode of the standing wave within the waveguide changes according to the ratio of the reflected wave the standing wave and the state of its phase to affect the operation efficiency of magnetron 3. The present invention is directed to maintain a high operating efficiency of magnetron 3 by adjusting the impedance by rotating metal reflector 95 in view of the phenomenon that impedance of the heating chamber 91 side seen from the magnetron 3 side is influenced by the state of food load.

Figure 28:
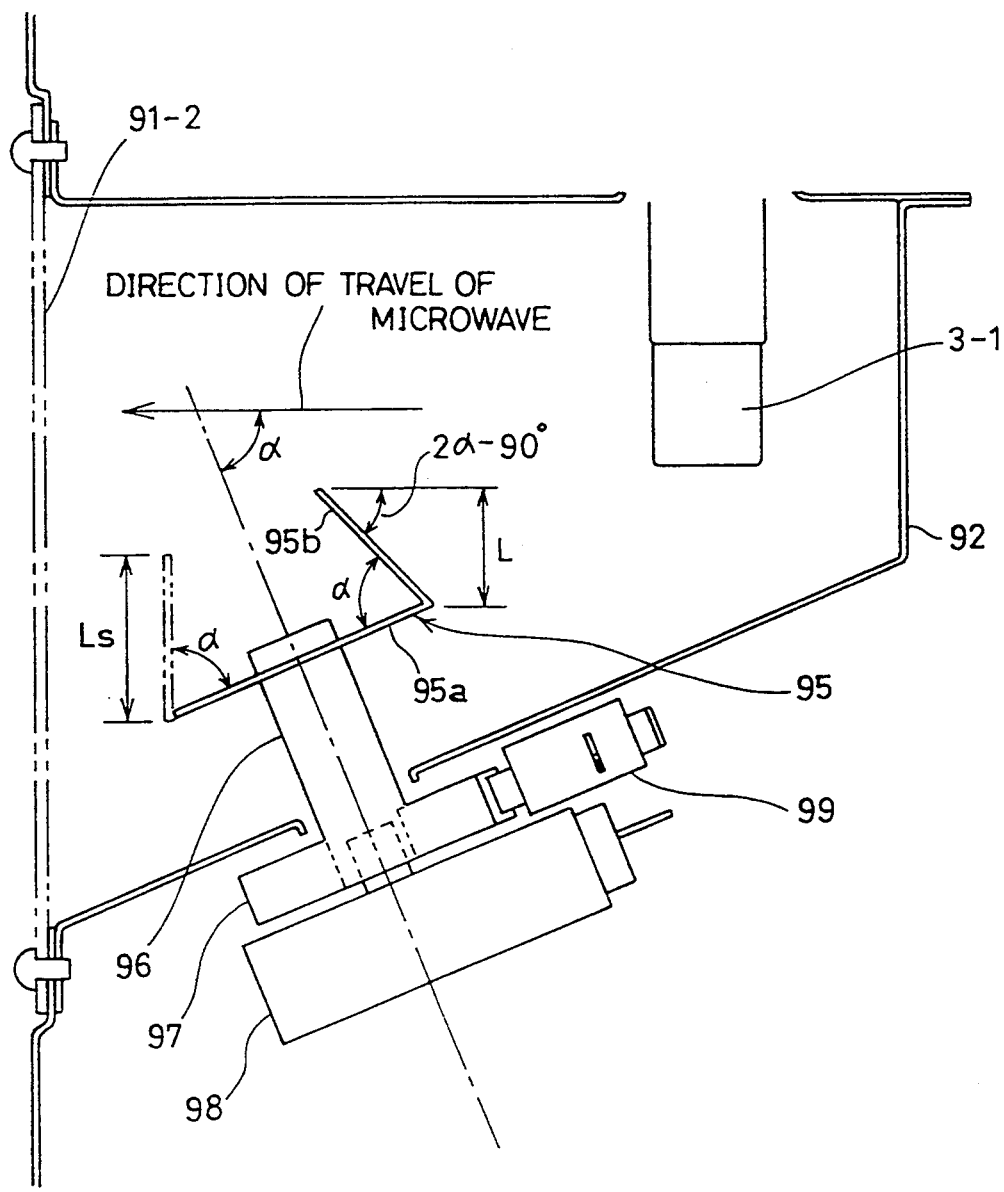
FIG. 28 is a sectional view of a metal reflector for describing change in impedance.

Particularly referring to FIGS. 26 and 27, metal reflector 95 includes a disk 95a of a non-magnetic metal such as aluminum, and a metal stub 95a formed in a bent manner at the peripheral edge of disk 95a, which is fixed to a rotation shaft 96 formed of a low dielectric constant dielectric material such as plastic or ceramics. Rotation shaft 96 is provided at an inclining angle of $\alpha$ with respect to the direction of travel of the microwave, as shown in FIG. 28. Rotation shaft 96 is connected to motor 98 outside the bottom of waveguide 92 having an inclining bottom 90a corresponding to the inclining angle of $\alpha$. Rotation shaft 96 is driven by motor 98.

Metal stub 95b of metal reflector 95 is provided on disk 95a at an inclining angle of $\alpha$ with respect to disk 95a. Metal stub 95b is orthogonal to the direction of travel of the microwave when positioned at the opening cover 4 side as shown in FIG. 26. When located at the magnetron antenna 3-1 side, stub 95b is set to have an inclining angle of $2\alpha-90°$ as shown in FIG. 28 with respect to the direction of travel of the microwave. Thus, the direction of the electric field (the direction of height) and the longitudinal component of $L = Ls \times \sin(2\alpha-90°)$ of metal stub 95b show a great change. Ls is the length of metal stub 95b. Thus, the impedance adjusting width (degree of adjustment) is great. In the present embodiment, the inclining angle $\alpha$ of rotation shaft 96 and metal stub 95b is 65°, the diameter of disk 95a is 30 mm, and the height of metal stub 95b is 18 mm.

By inclining rotation shaft 96 and metal stub 95b by 65°, the diameter of disk 95a can be reduced by 8 mm to realize impedance matching of an equal degree in comparison with the case where rotation shaft 96 and metal stub 95b are not inclined. Therefore, the metal reflector 95 can be made more compact.

Figure 29:
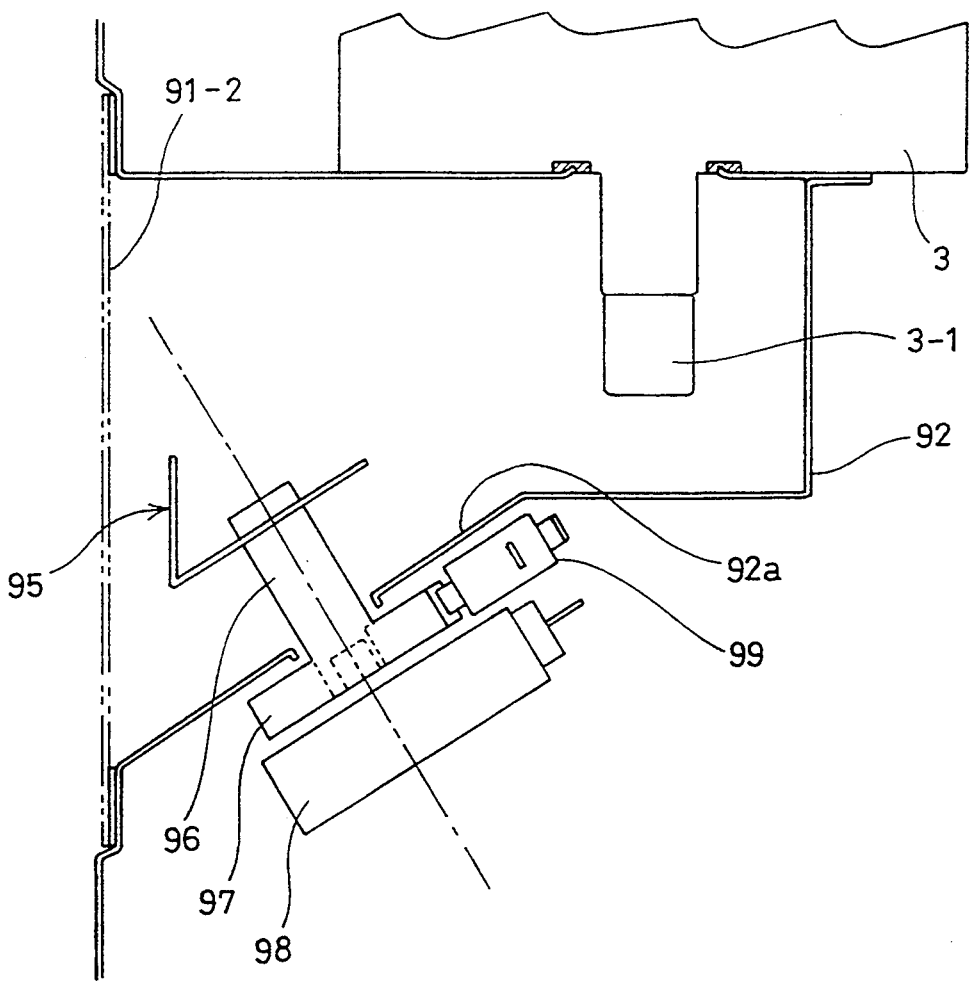
FIG. 29 is a vertical sectional view showing another embodiment of the waveguide portion.

As shown in FIG. 29, the portion of magnetron antenna 3-1 may be made a rectangular waveguide, and only waveguide wall 92a where metal reflector 95 and motor 98 are attached can be provided in an inclined manner. The inclination angle $\alpha$ of rotation shaft 96 and metal stub 95b can be set to a great angle without increasing the entire size of the waveguide. The impedance adjustment width can be further increased and reflector 95 made more compact.

By using a synchronous motor of a rotation velocity of 15 rpm having the direction of rotation restricted to one direction for motor 98 to rotate metal reflector 95, there is a merit of reducing the cost in comparison with the case where a stepping motor or a direct current motor is used.

Referring to FIGS. 26-28, cam 97 for detecting the base position of rotation for controlling the rotation position is provided at the lower end of rotation shaft 96. The base position is detected by a detection switch 96 formed of a microswitch. Referring to FIG. 27, particularly, when the position of stub 95a of metal reflector 95 by the rotation of motor 98 comes to the base position for controlling the rotation position, projection 97a provided in cam 97 operates detection switch 99, whereby detection switch 99 provides an ON/OFF signal to control circuit 100.

Referring to FIG. 25, control circuit 100 includes a peak hold circuit 111 for obtaining food weight information from piezoelectric weight sensor 110 which will be described later, an A/D converter 112, a logic operation control circuit 113 for controlling the rotation position of metal reflector 95, a memory 114, a timing circuit 115, and a motor driving circuit 116.

The weight and position information of the food item obtained by piezoelectric weight sensor 110 are converted into digital data by A/D converter 112. According to this digital data, logic operation control circuit 113 reads out the rotation position data of metal reflector 95 from memory 114 to control the energizing time of motor 98 to stop metal reflector 95 at a predetermined position. The rotation position data of metal reflector 95 is related with load weight (weight of food) obtained experimentally in advance as shown in FIG. 37 to be stored in memory 114 in a tabular manner.

Figure 34:
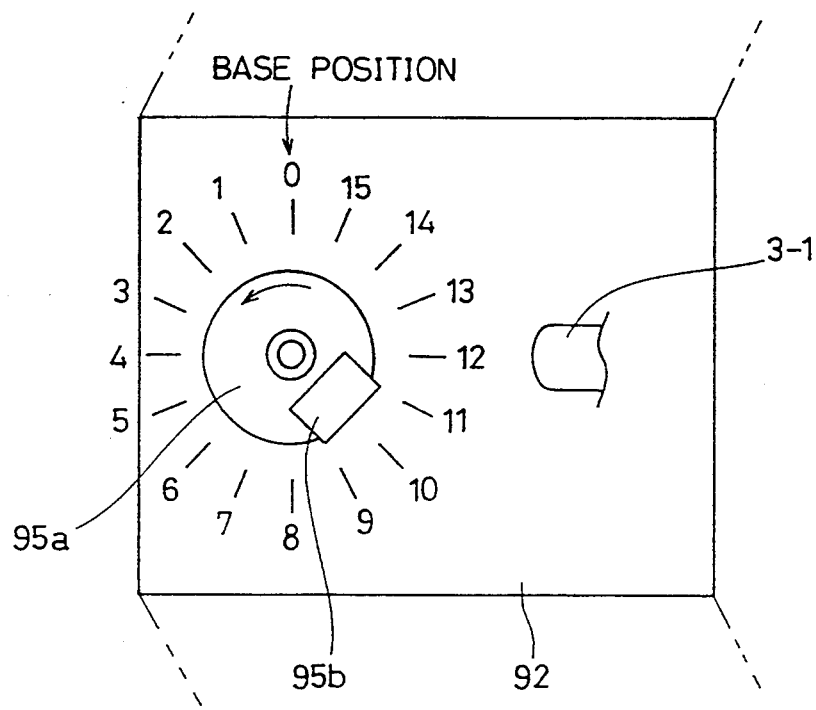
FIG. 34 is a diagram for describing the rotation position of a metal reflector for adjusting impedance.
Figure 37:
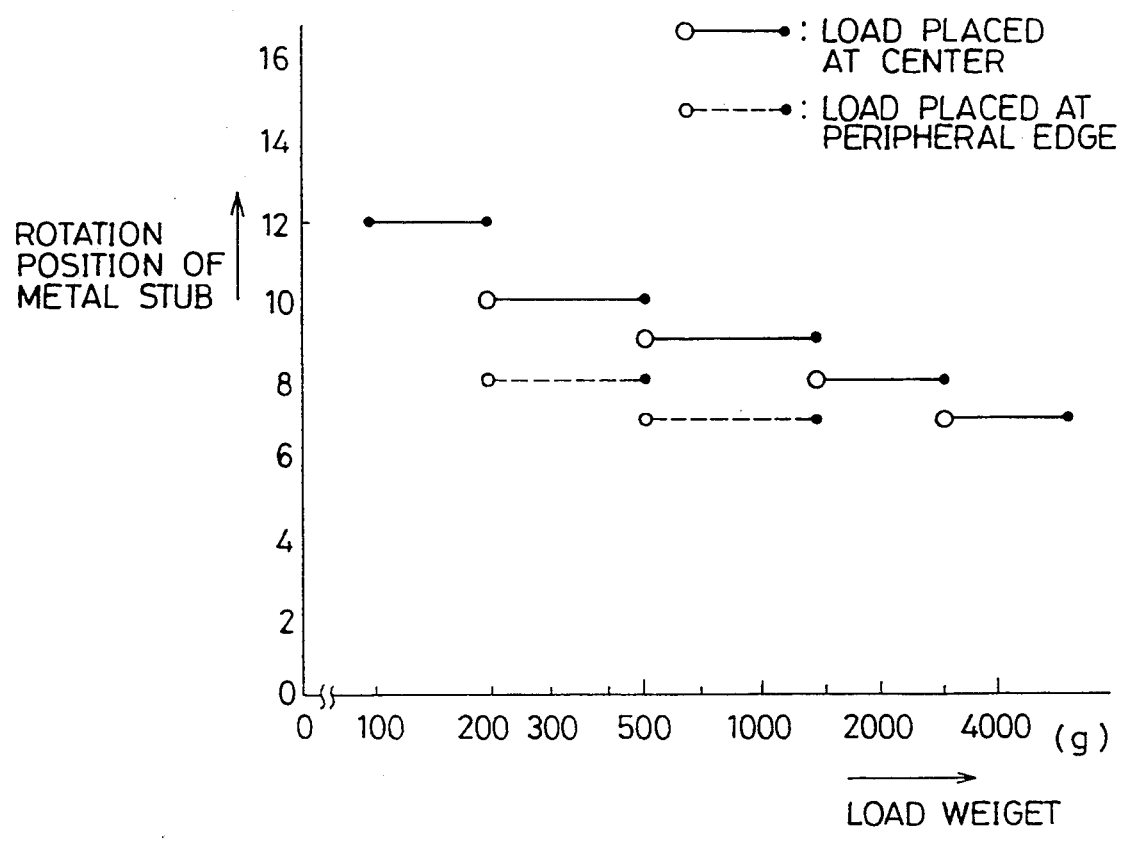
FIG. 37 is a data table showing a rotation position of a metal stub (metal reflector) with respect to load weight.

The value of the rotation position of metal stub shown in FIG. 37 represents a position where one rotation is divided into 16 (0-15). The position relation between the rotation position indicated by each numeric value and antenna 3-1 is as shown in FIG. 34. Metal reflector 95 is located at rotation position 10 in FIG. 34. Two conditions are prepared; when load is placed at the center of turntable 92; and when load is placed at the peripheral edge portion of turntable 92.

Control of the rotation position of metal reflector 95 is carried out as follows. Referring to FIG. 27, cam 97 rotates according to a rotation of rotation shaft 96, whereby projection 97a operates detection switch 9. Here, time count is initiated for control of the rotation position. Since a motor is employed which takes four seconds for one rotation, metal reflector 95 is rotated by 1/16 over an energizing time period of 250 msec.

FIG. 28 shows the effect of metal stub 95a of metal reflector 95 towards the electric field plane (E plane) of a microwave. It can be appreciated from FIG. 28 that there is a great voltage gradient in the vertical direction because the potential of the microwave is high at the center portion and low at the circumferential portion. When metal stub 95b is at the side of opening cover 11-2 in waveguide 92, the height Ls of metal stub 95b affects the voltage gradient of the electric field of the microwave. When metal stub 95b is at the antenna 3-1 side, the component in the height direction $L = L_s \times \sin(2\alpha - 90°)$ of metal stub 95b affects the gradient. By rotating metal reflector 95, the electric field of the standing wave in the direction of travel of the microwave is affected to result in improvement of impedance adjustment.

As shown in FIG. 25, a turntable 92, and a support roller base 93 for supporting turntable 92 are provided in oven 91. A turntable motor 94 is provided outside oven 91.

Figure 30:
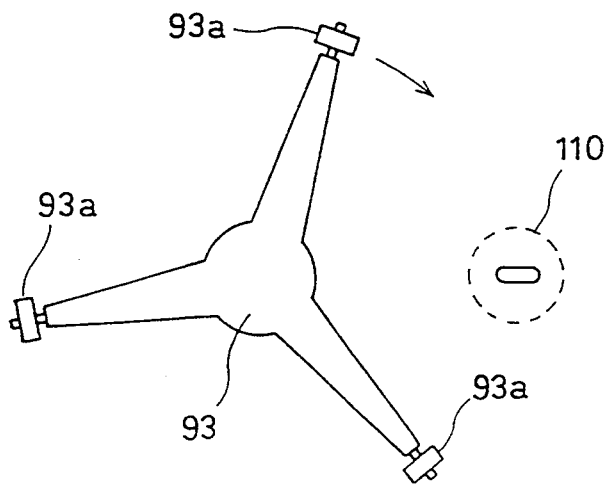
FIG. 30 is a plan view showing the relationship between the positions of a support roller base provided at the bottom of the heating chamber and a weight sensor.

Referring to FIG. 30, the structure is such that a detected signal of piezoelectric weight sensor 110 provided at a passing point of roller 93a of support roller base 93 is supplied to control circuit 100. Support roller base 93 is coupled to the driving shaft of turntable driving motor 94 (FIG. 25) by means of a coupling component. Three rollers 93a supported at the end portion of support roller base 93 rotate between turntable 92 and the bottom of oven 91 by the rotation of driving motor 94 to rotate turntable 92.

Figure 31A:
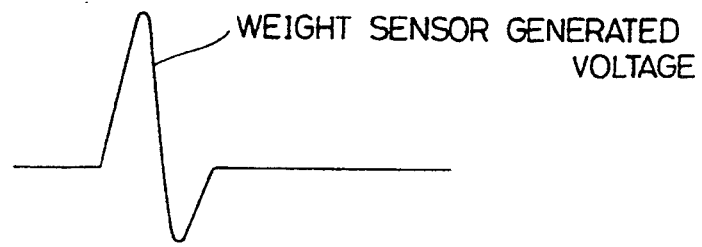
FIGS. 31A and 31B are waveform charts of a voltage output from a piezoelectric weight sensor.
Figure 31B:
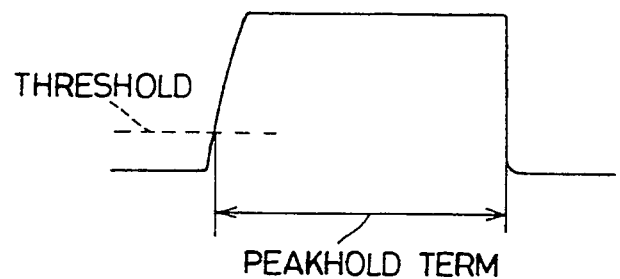

When roller 93a passes over piezoelectric weight sensor 110, a voltage signal shown in FIG. 31A is provided from weight sensor 110. Peak hold circuit 111 in control circuit 100 holds the level of a peak voltage signal exceeding the threshold voltage level for 200 msec to 300 msec as shown in FIG. 31B. A/D converter 112 reads the voltage level of the held signal to provide a digitalized data to logic operation control circuit 113. The technique regarding piezoelectric weight detection has already been employed in a microwave oven by the applicant of the present invention, and is disclosed in Japanese Patent Publication No. 3-20648 and in Japanese Utility Model Publication No. 3-17148.

Figure 32A:
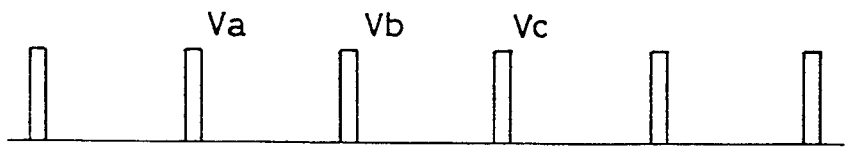
FIGS. 32A and 32B are voltage waveform charts showing the output value of a weight sensor of each roller according to difference in the mounted position of food on a turntable.

When food load is placed at the center of turntable 2, substantially one third of the food load is equally applied to each of the three rollers 93a. The output peak hold values Va, Vb and Vc corresponding to each of the three rollers 93a of weight sensor 110 take a substantially equal value as shown in FIG. 32A. The voltage converted value Vx of the food load weight is represented by Va+Vb+Vc.

Figure 32B:
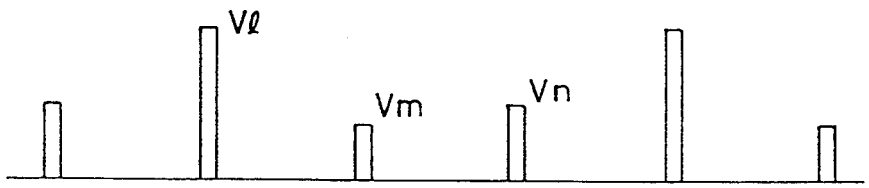

When the food load is placed at the peripheral edge of turntable 92, different weight is applied to the three rollers 93 according to the position of the food load. The output peak hold values Vl, Vm and Vn corresponding to the three rollers 93a of weight sensor 95 each take a different value as shown in FIG. 32B. The voltage converted value Vy of the food load weight is represented by Vl+Vm and Vn. If the food load is identical, Vx=Vy. Whether the food load is placed at the center of the turntable is determined as follows.

When all of the output peak hold values Vl, Vm and Vn corresponding to the three rollers 93a are all included within the ±30% of the voltage converted value Vy of the food load weight, determination is made that the food is placed at the center of turntable 92. When at least one of output peak hold values Vl, Vm and Vn corresponding to the three rollers 93a is not included within ±30% of the voltage converted value, determination is made that food is placed at the peripheral edge portion of turntable 92. That is to say, determination is made that food is placed at the center of turntable 92 if all the conditions of:

$$Vy \times 0.7 < Vl \times 3 < Vy \times 1.3$$

$$Vy \times 0.7 < Vm \times 3 < Vy \times 1.3$$

$$Vy \times 0.7 < Vn \times 3 < Vy \times 1.3$$

are satisfied, and determination is made that food is placed at the peripheral edge of turntable 92 if any of the above three conditions is not satisfied.

Figure 33:
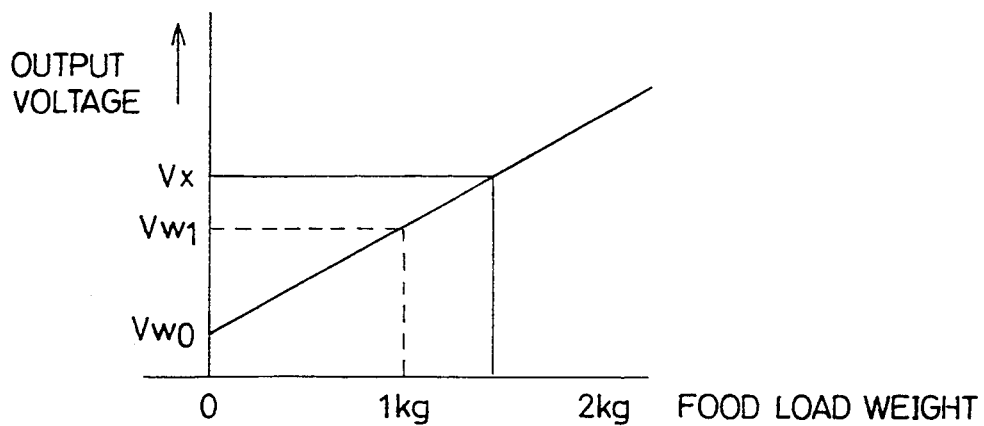
FIG. 33 is a graph showing the relationship between the conversion value of an output voltage with respect to weight of food load.

FIG. 33 is a graph showing the relationship of the weight of the food load placed on turntable 92 and the output voltage of piezoelectric weight sensor 110. It can be appreciated from FIG. 33 that they are in a proportional relation.

The output voltage at a no-load state where food is not placed on turntable 92 is $Vw_0$, and the output voltage when a food item of 1 kg is placed on turntable 92 is $Vw_1$. Food weight g is obtained by the following equation:

$$g = 1000 \times (Vx - Vw_0)/(Vw_1 - Vw_0)$$

Figure 35:
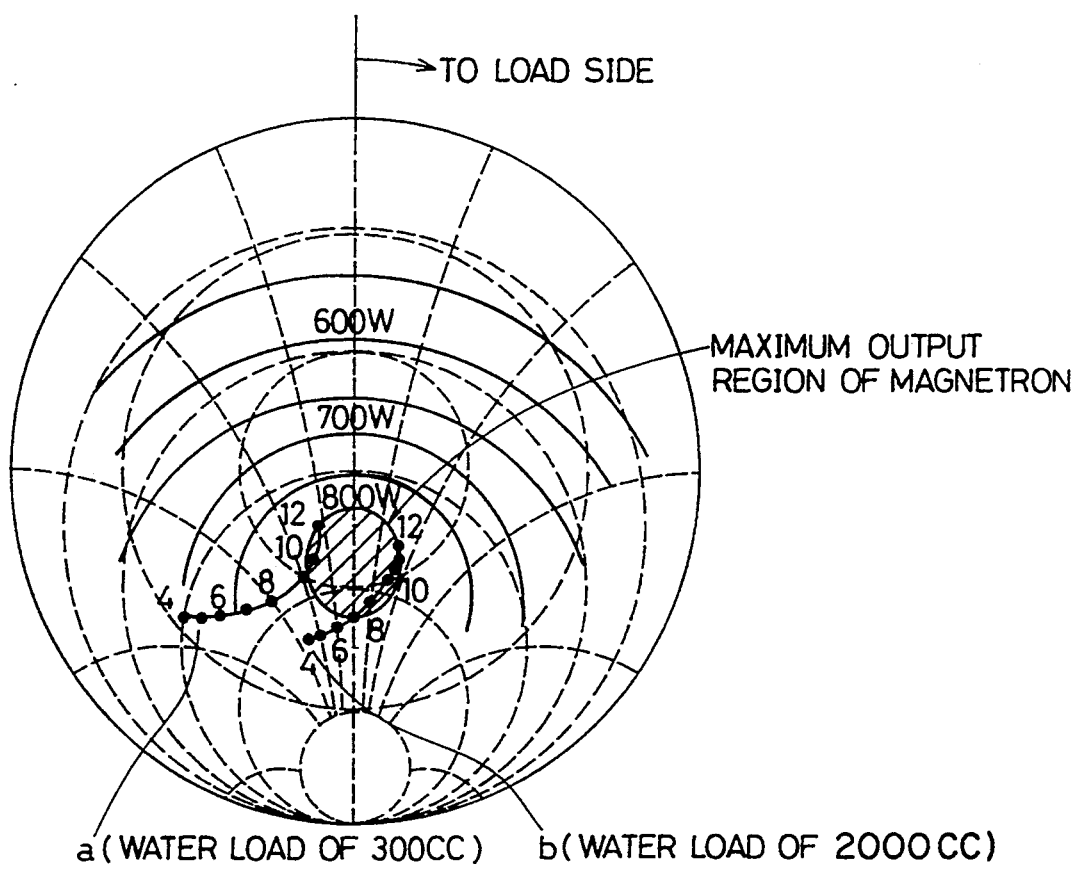
FIG. 35 is a Smith chart plotting impedance of the heating chamber when the metal reflector is rotated, wherein a represents water load of 300 cc and b represents water load of 2000 cc.

Referring to FIG. 35, the curve a shows the impedance at the oven side when water load of 300 cc is placed at the center of turntable 92, and curve b shows the impedance where water load of 2000 cc is placed at the center of turntable 92. If the structure of waveguide 92 and the position of antenna 3-1 is symmetrical about the center line of the direction of travel of the microwave in the horizontal cross section of waveguide 92, the impedance changing locus (plot line diagram) indicated by predetermined positions of number 4–12 on the Smith chart of FIG. 13 substantially coincides with the locus from the predetermined position of number 12 to number 4 through the base position (number 0) when metal reflector makes one rotation. Therefore, position control of metal reflector 95 may be carried out by either locus. However, the waveguide may not be symmetrical. Therefore, the position control of metal reflector 95 in the present embodiment is carried out within the rotation range of predetermined position numbers 4–12 to improve the accuracy of position control.

In the Smith chart of FIG. 35, the impedance for magnetron 3 to operate effectively and the maximum output operation region of magnetron 3 coincide with each other. Therefore, a microwave oven of high power efficiency can be realized by adjusting the impedance of the oven side exist within this maximum output region according to the food load condition in the oven.

Thus, according to the Smith chart of FIG. 35, the rotation position of metal reflector 95 is preferably set to number 9–11 on curve a, and to number 7–10 on curve b in the case of a light load of approximately 300 cc and in the case of a heavy load of approximately 2000 cc, respectively.

Figure 36:
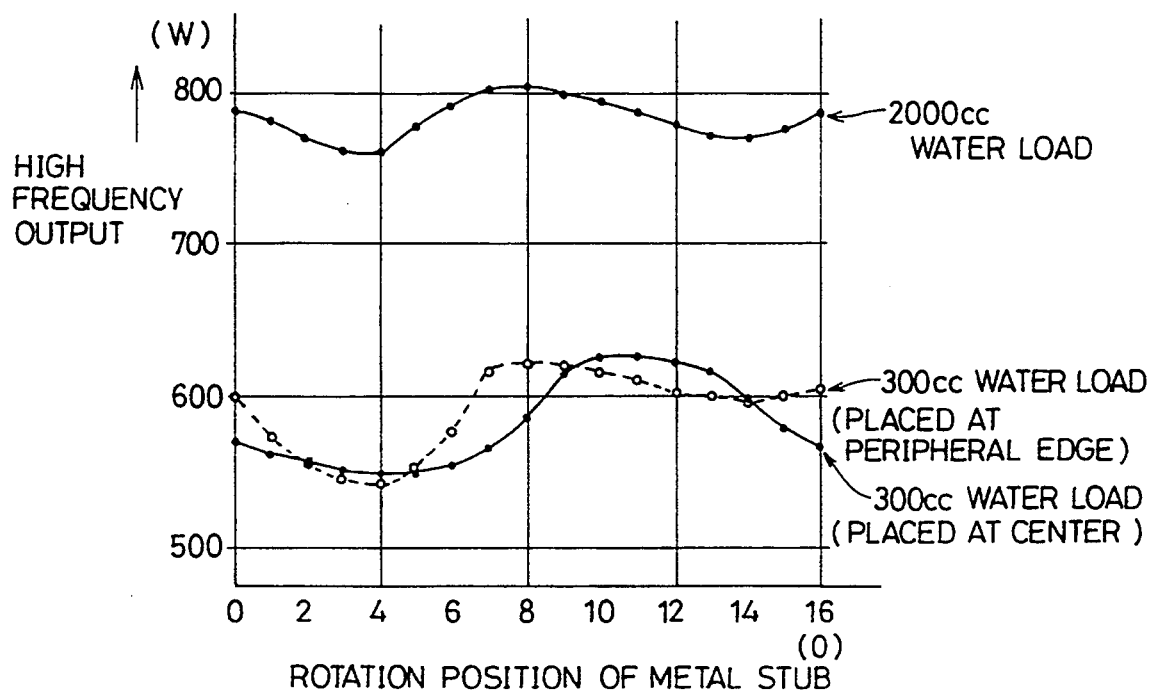
FIG. 36 shows the high frequency output of water loads of 2000 cc and 300 cc with the rotation position of a metal reflector as a parameter.

FIG. 36 shows a high frequency output in the case of loads of 2000 cc and 300 cc under parameters of the rotation position of metal stub 95b (metal reflector 95). Referring to FIG. 36, the rotation position of a high output state substantially coincides with the optimum rotation position of metal reflector 95 by the Smith chart of FIG. 36.

In the graph of FIG. 36, the high frequency output when the food load is placed at the center of turntable is shown by a block dot and a solid line, and the high frequency output when the food load is placed at the peripheral edge of the turntable is shown by a white circle and a broken line. If the load is light, the case must be considered where a small food item is placed at the peripheral edge of turntable 72. If the food load is great such as that exceeding 1.5 kg in weight, the container is also great in size and will naturally be placed at the center portion of the turntable. Therefore, in this case, the condition of load placed at the peripheral edge does not have to be considered.

According to the graph of FIG. 36, the rotation position of metal reflector 95 in the case of a food load corresponding to water of 2000 cc is preferably at number 8. In the case of a food load corresponding to water of 300 cc, the rotation position of metal reflector 95 is preferably at number 10 and at number 8 when food is placed at the center and at the peripheral edge portion of turntable 92, respectively.

FIG. 37 is a graph of the rotation angle of metal stub 95b (metal reflector 95) obtained by measuring data shown in FIG. 36 under the parameter of other load weight. The rotation position relation of metal reflector 95 corresponding to the load weight indicated in the graph is stored in advance as a data table in memory 114 of control circuit 100. Logic operation control circuit 113 looks up the rotation position of metal reflector 95 corresponding to a load weight from the data table for usage of control.

In heating light food of load not more than 100 g in weight (including no-load operation), a great thermal stress is applied in the microwave oven. Because a lot of microwave power is applied into the oven that has scarcely any load, local heating in turntable 92, support roller base 93 and the wall face of oven 91, and heating of magnetron 3 due to reflected power of the microwave are generated. This problem is alleviated to some degree according to the control of the rotation position of metal reflector 95. However in such a case, there is no load for greatly consuming the microwave, for example, a great food load, and this control of rotation position is critical. Furthermore, considering variation in the components produced by mass production, it is impossible to correspond to all the products of mass production. Thus, a completely different method of rotating continuously metal reflector 95 at the time of operation of a light load not more than 100 g is employed. Rotation of metal reflector 95 will shift the local heated position to disperse the local heat.

TABLE 1

|  | No Load–100 g | 101–200 g | 201–500 g A | 201–500 g B | 501–1500 g A | 501–1500 g B | 1501–3000 g | More Than 3000 g |
| --- | --- | --- | --- | --- | --- | --- | --- | --- |
| Warming | Rotate | 12 | 11 | 10 | 9 | 7 | 6 | 5 |
| Milk | Rotate | 12 | 12 | 10 | 10 | 7 | 8 | 7 |
| Warming Sake | Rotate | 12 | 11 | 8 | 9 | 6 | 7 | 4 |
| Vegetable Preparing | Rotate | 12 | 12 | 9 | 8 | 7 | 6 | 4 |
| Rice Cooking | Rotate | 12 | 10 | 8 | 9 | 7 | 6 | 5 |
| Defrosting | Rotate | Rotate | Rotate | Rotate | Rotate | Rotate | Rotate | Rotate |
| Manual | Rotate | 12 | 10 | 8 | 9 | 7 | 8 | 7 |

TABLE 1-continued

| | No Load–100 g | 101–200 g | 201–500 g | | 501–1500 g | | More Than | |
|---|---|---|---|---|---|---|---|---|
| | | | A | B | A | B | 1501–3000 g | 3000 g |
| Cooking | | | | | | | | |

A: load placed at center
B: load placed at peripheral edge
Rotate: Rotate metal reflector during heating operation Table 1 is a data table for controlling the rotation of the metal reflector corresponding to a cooking menu used in the microwave oven of the present embodiment. Because the impedance at the oven side is different even with the same load weight depending on the shape of the food and the container according to the cooking menu, impedance matching can be controlled more appropriately by the rotation control data of metal reflector 95 for each cooking menu.

Regarding defrosted cooking operation, attention is directed to the following points. There is a difference in dielectric constant with respect to microwave according to a portion not yet defrosted and the defrosted portion of the frozen food. This difference in dielectric constant causes only the defrosted portion to be easily heated due to concentration of an electric field in the defrosted portion. It is necessary to avoid concentration of microwave electric field in the food item during defrost cooking operation. For this purpose, metal reflector 95 is rotated continuously. The local concentration portion of microwave can be dispersed to prevent local heating, so that high microwave power can be provided. Thus, the time required for defrosting can be significantly reduced.

The position control of a metal reflector starting from initiation of a heating operation until the end of heating is described hereinafter.

In order to identify the food load, support roller base 93 (roller 93a) of turntable 92 must pass over weight sensor 110 at least three times. Therefore, at the start of a heating operation, the weight of load is not yet detected and the control data of the reflector shown in FIG. 37 and Table 1 cannot be utilized. Thus the position of metal reflector 95 is set presuming that a food item of light load is cooked until a control based on a detected weight can be carried out. More specifically, the initial position of metal reflector 95 is set to the position of number 10 as shown in FIG. 34 in the present embodiment. Thus, the cooking time of a food of light load can always be reduced.

According to the three input information from weight sensor 110 according to a rotation of support roller base 93, the weight of the food item is calculated and a determination is made whether the food is placed at the center portion or at the peripheral edge of turntable 92 as described above.

From the data table corresponding to the determined position of the food item (the data table relating to the rotation position of the metal reflector with respect to food weight), the rotation position of reflector 95 is looked up corresponding to the calculated weight. Motor 98 is rotatably driven to rotate metal reflector 95 to the obtained position from the initial position. This control of position has been described in the foregoing with reference to FIG. 27. Because metal reflector 95 passes the base position for every position setting in this position control, the stop position is very precise even if there is problem in the accuracy of the timing of initiating the rotation of motor 98.

This is heating of high power efficiency with impedance matched is carried out until elapse of a specified heated time or until the sensor detects completion of cooking.

If metal reflector 95 is set at an initial position corresponding to a light load food, heating of light load food can be carried out by high power efficiency from the start of a next heating cooking operation.

According to the present embodiment, the metal reflector for matching impedance can be made compact to avoid arcing phenomenon with the wall of the waveguide.

A microwave oven of low cost can be provided that carries out heating of high power efficiency according to the weight and placed position of a food item to be heated or according to a cooking menu.

Furthermore, the problem of local heating encountered at the time of operation of a light load including no load and at the time of defrost cooking can be solved. As a result, the microwave power at the time of defrost cooking can be improved accordingly to carry out defrosting uniformly to reduce the defrosting time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave oven comprising:
   a heating chamber having an opening through which a microwave is introduced therein,
   a turntable provided in said heating chamber for supporting a substance to be heated,
   means for generating a microwave,
   a waveguide for guiding said microwave into said heating chamber via said opening,
   means provided at the inner wall face of said waveguide or said heating chamber for detecting an electric field,
   a metal reflector provided rotatably about a predetermined shaft in the proximity of said opening in the interior of said waveguide for adjusting impedance of load at the side of said heating chamber by a rotation angle thereof, and
   means responsive to an output of said electric field detecting means for controlling the rotation angle of said metal reflector,
   wherein said control means comprises
      first means for controlling the rotation angle of said metal reflector according to a first control method during a predetermined time period after initiation of operation of said microwave oven, and
      second means for controlling the rotation angle of said metal reflector according to a second control method differing from said first control method after elapse of said predetermined time period after initiation of operation of said microwave oven.

2. The microwave oven according to claim 1, further comprising:
means for determining whether the angle position of said metal reflector satisfies a predetermined condition, and
means responsive to an output of said determination means for displaying a predetermined message.

3. The microwave oven according to claim 2, wherein said determination means comprises
means for detecting the angle position of said metal reflector,
means for detecting the range of change over a predetermined time of the output of said angle position detecting means, and
means for comparing said range of change with a predetermined tolerable range for providing the comparison result to said display means.

4. The microwave oven according to claim 1, wherein said first means comprises means for sequentially controlling the rotation angle of said metal reflector such that the output of said electric field detecting means is minimized.

5. The microwave oven according to claim 4, wherein said second means comprises
means for obtaining an average of the rotation angle position of said metal reflector over a predetermined time, and
means for controlling the position of said metal reflector to be fixed at said average of the rotation angle position.

6. The microwave oven according to claim 1, wherein said second means comprises
means for obtaining an average of the rotation angle position of said metal reflector over a predetermined time, and
means for controlling the position of said metal reflector to be fixed at said average of the rotation angle position.

7. The microwave oven according to claim 1, wherein said control means further comprises means for initiating control of the rotation angle of said metal reflector by said first means from a predetermined initial value.

8. The microwave oven according to claim 7, wherein said predetermined initial value is selected so that impedance of said load and said microwave generating means is matched when a load of a predetermined size is placed at the center of said turntable.

9. The microwave oven according to claim 8, wherein said load of a predetermined size is selected to be equivalent to a load of water within the range of 300 cc to 500 cc.

10. A microwave oven comprising:
a heating chamber,
microwave generating means,
a waveguide for guiding into said heating chamber a microwave generated by said microwave generating means, said waveguide having a concave portion at a predetermined position of the inner face thereof having a first opening communicating with outside of said waveguide,
electric field detecting means provided in said waveguide,
a dielectric shaft having an end inserted retractably into said waveguide via said first opening,
a stub of a non-magnetic metal attached to said end of said shaft in said waveguide, and formed of a size such that a portion thereof is retractable with a predetermined margin within said concave portion, and
control means responsive to an output of said electric field detecting means for controlling the length of the portion of said stub inserted into said waveguide from said concave portion to match impedance of said microwave generating means and the load in said heating chamber, the control means comprises,
stub position control means for changing the inserting amount of said stub into said waveguide within a predetermined range,
means for detecting satisfaction of a predetermined condition,
first means for controlling said stub position control means according to a first control method during the period starting from initiation of operation of said microwave oven until detection of satisfaction of said predetermined condition, and
second means responsive to the detection of satisfaction of said predetermined condition for controlling said stub position control means according to a second control method differing from said first control method.

11. The microwave oven according to claim 10, wherein said waveguide has a second opening formed in the proximity of said concave portion and having a size through which said stub can pass.

12. The microwave oven according to claim 11, further comprising means associated with said second opening for preventing leakage of a microwave outside of said waveguide via said second opening.

13. The microwave oven according to claim 12, wherein said means for preventing leakage comprises an inner circumferential wall of a predetermined height defining the inner circumference of said second opening.

14. The microwave oven according to claim 10, wherein said control means further comprises means for initiating control of the retractable move of said stub by said first means from a predetermined initial position.

15. The microwave oven according to claim 14, wherein said predetermined initial position of said stub is selected so that impedance between said load and said microwave generating means is matched when a load of a predetermined size is placed at the center of said heating chamber.

16. The microwave oven according to claim 15, wherein said first means comprises means for fixing the position of said stub to said predetermined initial position.

17. The microwave oven according to claim 16, wherein said means for detecting satisfaction of said predetermined condition comprises
means for determining a cooking operation time,
means for measuring a cooking operation time after initiation of a cooking operation, and
means for detecting a case where said determined cooking operation time is not less than a predetermined first value and where said measured cooking operation time is not less than a predetermined second value.

18. The microwave oven according to claim 17, wherein said second value is selected to be equal to a time period for the operation of said microwave generating means to be stabilized.

19. The microwave oven according to claim 18, wherein said second means comprises
   means for controlling said stub position control means to continuously move said stub over a predetermined portion of said predetermined range,
   means for detecting a first position of said stub which provides a minimum value of the output of said electric field detecting means during the movement of said stub over said predetermined portion of said predetermined range, and
   means for driving said stub position control means to move said stub to said first position.

20. The microwave oven according to claim 19, wherein said one portion of said predetermined range includes at least more than one half of said predetermined range.

21. The microwave oven according to claim 20, wherein said stub position control means comprises
   a synchronous motor having a rotation shaft rotatable in a single direction, and
   motion converting means coupled to said rotation shaft for converting the rotation motion of said rotation shaft to a reciprocating motion of said stub.

22. The microwave oven according to claim 21, wherein said control means further comprises means for operating a plurality of times said second means until completion of cooking.

23. A microwave oven having impedance matching function comprising:
   a heating chamber having an opening through which a microwave is introduced therein,
   means for generating a microwave,
   a waveguide for guiding said microwave in a predetermined direction of travel to introduce the microwave into said heating chamber via said opening,
   means provided rotatably about a predetermined shaft in the vicinity of said opening in said waveguide for adjusting impedance of load at said heating chamber side by a rotation angle thereof,
   means for detecting weight of a substance to be heated conveyed into said heating chamber,
   means for prestoring a table prepared in advance of target rotation angles of said means for adjusting impedance corresponding to different weights of a substance to be heated, and
   means for controlling the rotation angle of said means for adjusting impedance by collating said detected weight with said table of target rotation angles,
   wherein said means for adjusting impedance comprises,
      a rotation shaft provided in said waveguide so as to cross said direction of travel by a predetermined angle,
      a first member having a metal face attached to said rotation shaft, and
      a second member formed projecting from said metal face at a prescribed angle at a position in said waveguide, said position moving in accordance with rotation of said rotation shaft on said metal face.

24. A microwave oven comprising:
   a heating chamber having an opening through which a microwave is introduced therein,
   means for generating a microwave,
   a waveguide for guiding said microwave in a predetermined direction of travel to introduce the same into said heating chamber via said opening,
   means provided rotatably about a predetermined shaft in the proximity of said opening in said waveguide for adjusting impedance of load at said heating chamber side by a rotation angle thereof, and
   means for controlling a rotation angle of said means for adjusting impedance,
   wherein said means for adjusting impedance comprises a metal reflector including
      a rotation shaft provided in said waveguide so as to cross said direction of travel by a predetermined angle $\alpha$,
      a first member having a metal face attached to said rotation shaft, and
      a second member formed projecting from said metal face at a prescribed angle $\alpha$ at a position in said waveguide, said position moving in accordance with rotation of said rotation shaft on said metal face.

25. The microwave oven according to claim 24, wherein said rotation shaft is formed of a dielectric.

26. The microwave oven according to claim 25, further comprising means provided at the inner wall face of said waveguide or said heating chamber for detecting an electric field,
   wherein said means for controlling a rotation angle of said means for adjusting impedance comprises
   means responsive to an output of said electric field detecting means for controlling a rotation angle of said means for adjusting impedance, and
   said rotation shaft is provided substantially perpendicular to the direction of travel of said microwave.

27. The microwave oven according to claim 26, wherein said first member has said metal face attached to said rotation shaft so as to be substantially parallel to said direction of travel.

28. The microwave oven according to claim 27, wherein said second member is formed substantially at right angles with said metal face.

29. The microwave oven according to claim 26, wherein said control means comprises means for adjusting the rotation angle of said means for controlling impedance so that the output of said means for detecting intensity of an electric field is reduced.

30. The microwave oven according to claim 26, further comprising a turntable provided in said heating chamber for supporting a substance to be heated.

31. The microwave oven according to claim 30, wherein said control means comprises
   means for prestoring intensity of a target electric field prepared by a predetermined method, and
   means for controlling the rotation angle of said metal reflector so that the output of said means for detecting intensity of an electric field and said intensity of the target electric field have a predetermined relationship.

32. The microwave oven according to claim 31, wherein said means for controlling the rotation angle of said metal reflector comprises
   means for obtaining a predetermined representative value of an output of said means for detecting intensity of an electric field over a predetermined number of rotations of said turntable,
   means for obtaining difference between said representative value and said target value, and means for adjusting the rotation angle of said metal reflector so that said difference between said representative value and said target value is within a predetermined range.

33. The microwave oven according to claim 32, wherein said representative value is a maximum value.

34. The microwave oven according to claim 32, wherein said representative value is a minimum value.

35. The microwave oven according to claim 33, wherein said predetermined number is one.

36. The microwave oven according to claim 32, wherein said means for obtaining said predetermined representative value comprises means for obtaining a predetermined plurality of representative values of an output of said means for detecting intensity of an electric field over a predetermined number of rotations of said turntable.

37. The microwave oven according to claim 36, wherein said plurality of representative values comprise a maximum value and a minimum value.

38. The microwave oven according to claim 26, wherein said control means comprises
first means for controlling the rotation angle of said means for adjusting impedance according to a first control method during initiation of operation of said microwave oven until a predetermined condition is met,
second means for controlling the rotation angle of said means for adjusting impedance according to a second control method different from said first control method after said predetermined condition is met following initiation of operation of said microwave oven.

39. The microwave oven according to claim 38, wherein said first means comprises means for fixing the rotation angle of said means for adjusting impedance so that, when a predetermined load is placed at the center of the bottom portion of said heating chamber, impedance of said predetermined load is in a position where said microwave generating means generates a maximum output.

40. The microwave oven according to claim 39, wherein said second means comprises
means for prestoring a target rotation angle of said means for adjusting impedance prepared in advance corresponding to different weight of a substance to be heated,
means for prestoring a target value of an output of said means for detecting intensity of an electric field,
means for detecting weight of a substance to be heated conveyed into said heating chamber, and
first control means for controlling the rotation angle of said means for adjusting impedance so that output of said means for detecting intensity of an electric field approximates the target value with the target rotation angle of said means for adjusting impedance corresponding to said detected weight set as an initial value.

41. The microwave oven according to claim 40, further comprising a turntable provided in said heating chamber for supporting a substance to be heated.

42. The microwave oven according to claim 41, wherein said first control means for controlling the rotation angle comprises the means for controlling the rotation angle of said means for adjusting impedance so that the output of said means for detecting intensity of said electric field is a predetermined representative value and the means for controlling the rotation angle being second control means, the predetermined representative value over a predetermined number of times of rotation of said turntable and said target value have the predetermined relationship.

43. The microwave oven according to claim 42, wherein said second means for controlling the rotation angle of said means for adjusting impedance comprises
the means for obtaining a predetermined representative value of an output of said means for detecting intensity of an electric field over a predetermined number of times of rotation of said turntable,
the means for obtaining difference between said representative value and said target value, and
the means for adjusting the rotation angle of said means for adjusting impedance so that said difference between said representative value and said target value is within a predetermined range.

44. The microwave oven according to claim 43, wherein said representative value is an average value.

45. The microwave oven according to claim 44, wherein said predetermined number is one.

46. The microwave oven according to claim 45, wherein said means for obtaining said predetermined representative value comprises
a support roller for supporting said turntable by a bottom portion thereof and for moving in a circular motion on the bottom of said heating chamber in accordance with rotation of said turntable,
a weight sensor provided at a passing position of said support roller for generating a predetermined detection signal every time said support roller passes over said passing position,
sampling means for sampling an output of said means for detecting intensity of an electric field at a predetermined sampling frequency,
means responsive to said detection signal for initiating integration of said sampling means, and responsive to a next said detection means for providing an integrated value, and
means for dividing said integrated value by a numeric value determined by said sampling frequency for providing an average intensity of said means for detecting intensity of an electric field.

47. The microwave oven according to claim 25, wherein said predetermined angle α is selected to be greater than 0° and smaller than 90° toward said heating chamber.

48. The microwave oven according to claim 47, wherein said second member is provided so that its center axis is inclined by said predetermined angle α at toward said rotation shaft side with respect to said metal face.

49. The microwave oven according to claim 24, wherein said control means comprises
means for prestoring a table prepared in advance of target rotation angles of said means for adjusting impedance corresponding to different weights of a substance to be heated,
means for detecting weight of a substance to be heated conveyed into said heating chamber, and
means for controlling the rotation angle of said means for adjusting impedance by collating said detected weight with said table of target rotation angles.

50. The microwave oven according to claim 49, wherein said control means further comprises
means for detecting no load in said heating chamber, and means responsive to detection of no load for rotating continuously at a predetermined speed said means for adjusting impedance.

51. A microwave oven comprising:

a heating chamber having an opening through which a microwave is introduced therein, means for generating a microwave, a waveguide for guiding said microwave in a predetermined direction of travel to introduce the same into said heating chamber via said opening, means provided rotatably about a predetermined shaft in the proximity of said opening in said waveguide for adjusting impedance of load at said heating chamber side by a rotation angle thereof, a turntable provided in said heating chamber for supporting a substance to be heated, means for controlling a rotation angle of said means for adjusting impedance, wherein said means for adjusting impedance comprises a metal reflector including a rotation shaft provided in said waveguide so as to cross said direction of travel by a predetermined angle $\alpha$, a first member having a metal face attached to said rotation shaft, a second member formed projecting from said metal face at a prescribed angle $\alpha$ at a position in said waveguide, said position moving in accordance with rotation of said rotation shaft on said metal face, and means provided at the inner wall face of said waveguide or said heating chamber for detecting intensity of an electric field, the control means comprises means for prestoring intensity of a target value for an electric field prepared by a predetermined method, and means for controlling the rotation angle of said metal reflector so that the output of the means for detecting intensity of the electric field and said intensity of the target value for the electric field have a predetermined relationship, said means for controlling the rotation angle of said reflector comprises means for obtaining a predetermined representative value of an output of said means for detecting intensity of an electric field over a predetermined number of rotations of said turntable, means for obtaining difference between said representative value and said target value, and means for adjusting the rotation angle of said metal reflector so that said difference between said representative value and said target value is within a predetermined range.

52. The microwave oven according to claim 51, wherein said rotation shaft is formed of a dielectric.

53. The microwave oven according to claim 52, wherein said means for controlling a rotation angle of said means for adjusting impedance comprises;

means responsive to an output of said electric field detecting means for controlling a rotation angle of said means for adjusting impedance, and said rotation shaft is provided substantially perpendicular to the direction of travel of said microwave.

54. The microwave oven according to claim 51, wherein said representative value is a maximum value.

55. The microwave oven according to claim 51, wherein said representative value is a minimum value.

56. The microwave oven according to claim 51, wherein said predetermined number is one.

57. The microwave oven according to claim 51, wherein said means for obtaining said predetermined representative value comprises means for obtaining a predetermined plurality of representative values of an output of said means for detecting intensity of an electric field over a predetermined number of rotations of said turntable.

58. The microwave oven according to claim 57, wherein said plurality of representative values comprise a maximum value and a minimum value.

59. The microwave oven according to claim 51, wherein said control means comprises first means for controlling the rotation angle of said means for adjusting impedance according to a first control method during initiation of operation of said microwave oven until a predetermined condition is met, second means for controlling the rotation angle of said means for adjusting impedance according to a second control method different from said first control method after said predetermined condition is met following initiation of operation of said microwave oven.

60. The microwave oven according to claim 59, wherein said first means comprises means for fixing the rotation angle of said means for adjusting impedance so that, when a predetermined load is placed at the center of the bottom portion of said heating chamber, impedance of said predetermined load is in a position where said microwave generating means generates a maximum output.

61. The microwave oven according to claim 60, wherein said second means comprises means for prestoring a target rotation angle of said means for adjusting impedance prepared in advance corresponding to different weight of a substance to be heated, means for prestoring a target value of an output of said means for detecting intensity of an electric field, means for detecting weight of a substance to be heated conveyed into said heating chamber, and first control means for controlling the rotation angle of said means for adjusting impedance so that output of said means for detecting intensity of an electric field approximates the target value with the target rotation angle of said means for adjusting impedance corresponding to said detected weight set as an initial value.

62. The microwave oven according to claim 61, wherein said first control means for controlling the rotation angle comprises the means for controlling the rotation angle of said means for adjusting impedance so that the output of said means for detecting intensity of said electric field is a predetermined representative value and the means for controlling the rotation angle being second control means, the predetermined representative value over a predetermined number of times of rotation of said turntable and said target value have the predetermined relationship.

63. The microwave oven according to claim 62, wherein said second means for controlling the rotation angle of said means for adjusting impedance comprises the means for obtaining a predetermined representative value of an output of said means for detecting intensity of an electric field over a predetermined number of times of rotation of said turntable, the means for obtaining difference between said representative value and said target value, and the means for adjusting the rotation angle of said means for adjusting impedance so that said difference between said representative value and said target value is within a predetermined range.

64. The microwave oven according to claim 63, wherein said representative value is an average value.

65. The microwave oven according to claim 64, wherein said predetermined number is one.

66. The microwave oven according to claim 65, wherein said means for obtaining said predetermined representative value comprises a support roller for supporting said turntable by a bottom portion thereof and for moving in a circular motion on the bottom of said heating chamber in accordance with rotation of said turntable, a weight sensor provided at a passing position of said support roller for generating a predetermined detection signal every time said support roller passes over said passing position, sampling means for sampling an output of said means for detecting intensity of an electric field at a predetermined sampling frequency, means responsive to said detection signal for initiating integration of said sampling means, and responsive to a next said detection means for providing an integrated value, and means for dividing said integrated value by a numeric value determined by said sampling frequency for providing an average intensity of said means for detecting intensity of an electric field.

67. The microwave oven according to claim 51, wherein said control means comprises means for prestoring a table prepared in advance of target rotation angles of said means for adjusting impedance corresponding to different weights of a substance to be heated, means for detecting weight of a substance to be heated conveyed into said heating chamber, and means for controlling the rotation angle of said means for adjusting impedance by collating said detected weight with said table of target rotation angles.

68. The microwave oven according to claim 67, wherein said control means further comprises means for detecting no load in said heating chamber, and means responsive to detection of no load for rotating continuously at a predetermined speed said means for adjusting impedance.

* * * * *